United States Patent
Frink

(10) Patent No.: US 10,623,329 B2
(45) Date of Patent: Apr. 14, 2020

(54) QUEUING SYSTEM TO PREDICT PACKET LIFETIME IN A COMPUTING DEVICE

(71) Applicant: Juniper Networks, Inc., Sunnyvale, CA (US)

(72) Inventor: Craig R. Frink, Chelmsford, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 16/020,842

(22) Filed: Jun. 27, 2018

(65) Prior Publication Data

US 2020/0007454 A1    Jan. 2, 2020

(51) Int. Cl.
| | | |
|---|---|---|
| *H04L 12/54* | (2013.01) | |
| *H04L 12/863* | (2013.01) | |
| *H04L 12/823* | (2013.01) | |
| *H04L 12/911* | (2013.01) | |
| *H04L 12/851* | (2013.01) | |
| *H04L 12/841* | (2013.01) | |

(52) U.S. Cl.
CPC ...... *H04L 47/6295* (2013.01); *H04L 47/2441* (2013.01); *H04L 47/283* (2013.01); *H04L 47/32* (2013.01); *H04L 47/823* (2013.01)

(58) Field of Classification Search
USPC .. 370/229, 235, 252, 395.7, 395.71, 395.72, 370/412, 413, 428, 429
See application file for complete search history.

(56) References Cited

U.S. PATENT DOCUMENTS

| | | | | |
|---|---|---|---|---|
| 7,756,977 | B2* | 7/2010 | Yong | H04L 47/10 709/225 |
| 8,184,540 | B1* | 5/2012 | Perla | H04L 47/568 370/235 |
| 2007/0005925 | A1* | 1/2007 | Burkley | G06F 12/023 711/170 |
| 2011/0040923 | A1 | 2/2011 | Ren | |

(Continued)

FOREIGN PATENT DOCUMENTS

TW    201812591 A    4/2018

OTHER PUBLICATIONS

Sajassi et al., "BGP MPLS-Based Ethernet VPN," RFC 7432, Internet Engineering Task Force (IETF), Feb. 2015, 56 pp.

(Continued)

*Primary Examiner* — Kwang B Yao
*Assistant Examiner* — Nguyen H Ngo
(74) *Attorney, Agent, or Firm* — Shumaker & Sieffert, P.A.

(57) ABSTRACT

Techniques are disclosed for a queuing system for network devices. In one example, a network device includes a plurality of memories and processing circuitry connected to the plurality of memories. The plurality of memories includes a local memory of processing circuitry and an external memory to the processing circuitry. The processing circuitry is configured to receive an incoming network packet to be processed, wherein the network packet is held in a queue prior to processing and determine a predicted lifetime of the network packet based on a dequeue rate for the queue. The processing circuitry is further configured to select a first memory from the plurality of memories based on the predicted lifetime and store the network packet at the first memory in response to selecting the first memory from the plurality of memories.

25 Claims, 12 Drawing Sheets

(56) References Cited

U.S. PATENT DOCUMENTS

| | | | | |
|---|---|---|---|---|
| 2015/0244804 A1* | 8/2015 | Warfield | ............ | H04L 47/6295 |
| | | | | 709/219 |
| 2017/0005953 A1* | 1/2017 | Bracha | ............... | H04L 49/9052 |
| 2017/0242625 A1* | 8/2017 | Pandurangan | ........ | G06F 3/0659 |
| 2017/0317944 A1* | 11/2017 | John | ...................... | H04L 47/56 |
| 2017/0366476 A1* | 12/2017 | Sweeney | ................ | H04L 47/24 |

OTHER PUBLICATIONS

Extended European Search Report received in counterpart EP Application No. 19181454.0, dated Oct. 22, 2019, 9 pp.

* cited by examiner

QUEUING SYSTEM TO PREDICT PACKET LIFETIME IN A COMPUTING DEVICE

TECHNICAL FIELD

This disclosure generally relates to computing devices and, particularly, queuing in networking devices.

BACKGROUND

A computer network is a collection of interconnected network devices that can exchange data and share resources. Example network devices include routers, switches, and other layer two (L2) network devices that operate within layer two of the Open Systems Interconnection (OSI) reference model, i.e., the data link layer, and layer three (L3) network devices that operate within layer three of the OSI reference model, i.e., the network layer. Network devices within computer networks often include a control unit that provides control plane functionality for the network device and forwarding components for routing or switching data units.

A network switch of a computer network may use a queue to help to provide bandwidth matching between senders and receivers. More specifically, the network switch receives packets from a sender at a relatively fast rate. The network switch transmits a portion of the received packets from the sender to a receiver at a relatively slow rate and stores a remaining portion of the received packets in the queue. After transmitting the portion of the received packets, the network switch transmits the packets stored in the queue to the receiver at the relatively slow rate.

SUMMARY

In general, this disclosure describes techniques for improved queueing systems in network devices. A network device, such as a router or a switch, may enqueue packets in one or more queues prior to switching internally between packet forwarding engines, or prior to transmitting the packets over the network. Packets for a queue may be stored in a delay bandwidth buffer, which may be implemented as a "hybrid memory" that includes both local memory (e.g., on chip memory) and external memory (e.g., High Bandwidth Memory (HBM)).

Accordingly, the techniques of the disclosure describe a queueing system for a network device that predicts packet "lifetime," which is also referred to herein as "predicted lifetime," for selecting between the local memory and external memory. Lifetime is a prediction of the time a packet expects to be resident in the delay bandwidth buffer. In accordance with the described techniques, a network device stores packets with a "short" lifetime (e.g., packets written and read quickly in time) in the local memory and stores packets with a "long" lifetime (e.g., packets written, but read much later in time compared to packets with a short lifetime) in the external memory.

Techniques of the disclosure use lifetime to optimize the hybrid memory performance by anticipating delay bandwidth buffer requirements of the packets, and placing the packets in the "best" memory for the packets' predicted lifetime. For example, a network device may store packets that enter and exit the delay bandwidth buffer quickly in local memory, and store packets that "linger" in external memory. Techniques described herein may predict queue latency by measuring the queue length, also referred to herein as "Qlength" and the dequeue rate, also referred to herein as "DQrate" (e.g., transmit rate) of the queue. The latency measure is the time a packet is expected to be resident in the queue. In addition, the technique may determine queue congestion and move queues experiencing congestion to external memory before waiting for the queue length and latency to grow, which may help to avoid precious local memory usage.

In one example, this disclosure describes a method including: receiving, by processing circuitry of a networking device, an incoming network packet to be processed, wherein the network packet is held in a queue prior to processing; determining, by the processing circuitry, a predicted lifetime of the network packet based on a dequeue rate for the queue; selecting, by the processing circuitry, a first memory from a plurality of memories for the network packet based on the predicted lifetime, wherein the plurality of memories includes a local memory of the processing circuitry and an external memory to the processing circuitry; and storing, by the processing circuitry, the network packet at the first memory in response to selecting the first memory from the plurality of memories.

In another example, this disclosure describes a networking device including: a plurality of memories comprising a local memory of processing circuitry and an external memory to the processing circuitry; and the processing circuitry connected to the plurality of memories. The processing circuitry is configured to: receive an incoming network packet to be processed, wherein the network packet is held in a queue prior to processing; determine a predicted lifetime of the network packet based on a dequeue rate for the queue; select a first memory from the plurality of memories based on the predicted lifetime; and store the network packet at the first memory in response to selecting the first memory from the plurality of memories.

In another example, this disclosure describes a non-transitory computer-readable medium including instructions that, when executed, cause processing circuitry of a networking device to: receive an incoming network packet to be processed, wherein the network packet is held in a queue prior to processing; determine a predicted lifetime of the network packet based on a dequeue rate for the queue; select a first memory from a plurality of memories for the network packet based on the predicted lifetime, wherein the plurality of memories includes a local memory of the processing circuitry and an external memory to the processing circuitry; and store the network packet at the first memory in response to selecting the first memory from the plurality of memories.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
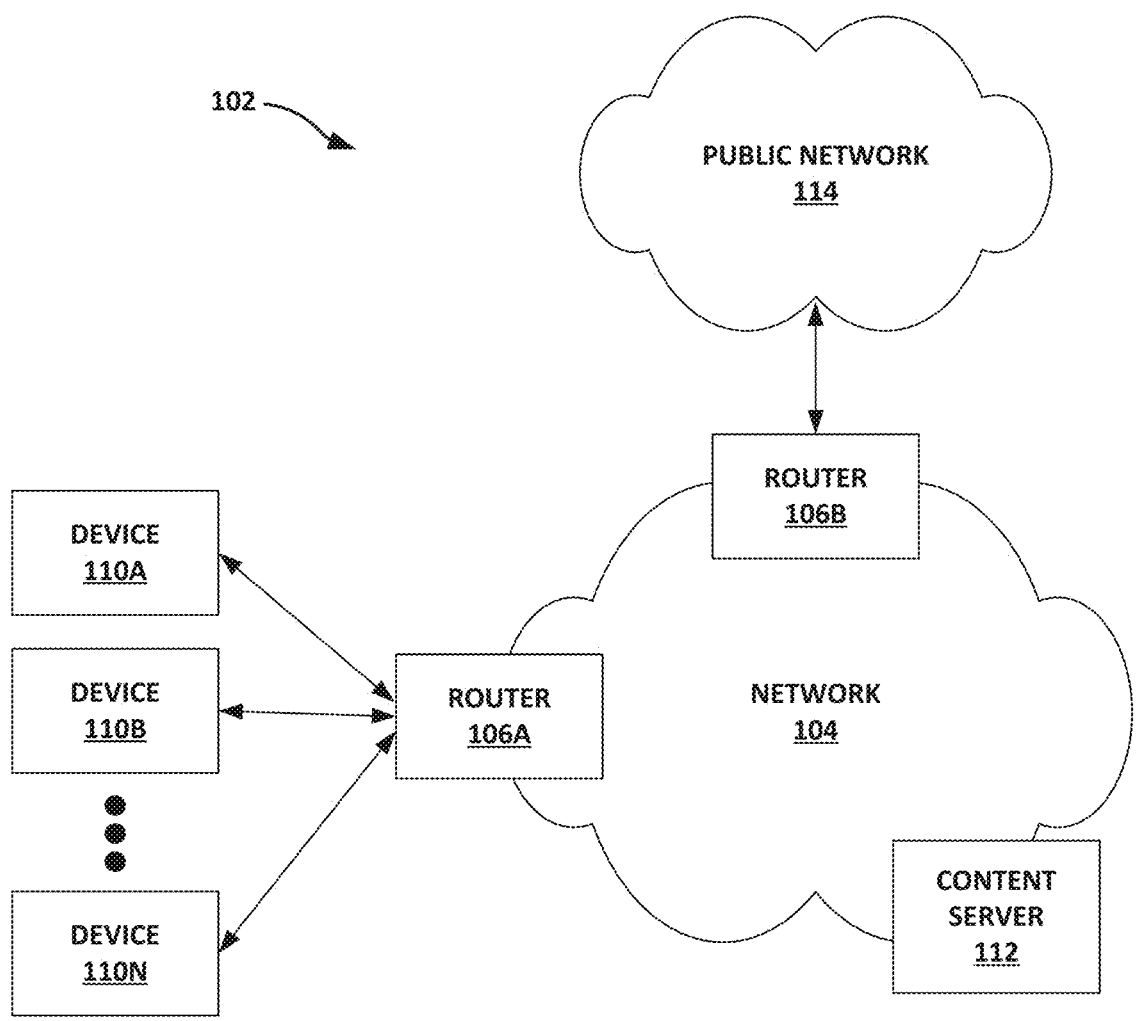
FIG. 1 is a block diagram illustrating an example network in accordance with the techniques of the disclosure.

FIG. 1 is a block diagram illustrating an exemplary system 102 in which network 104 includes routers 106A-106B (collectively, routers 106). Devices 110A-110N (collectively, devices 110) connect to network 104 via routers 106 in order to access resources provided by network 104. Each of devices 110 may be an end-user computing device, such as a personal computer, a laptop computer, a mobile telephone, a network telephone, a television set-top box, a video game system, a point-of-sale device, a personal digital assistant, an intermediate network device, a network appliance, a supercomputer, a mainframe computer, an industrial robot, or another type of device capable of interfacing with and communicating over network 104.

Network 104 may include a plurality of network devices that facilitate the access of content by devices 110. Each of the plurality of network devices may comprise one of a router, a switch, a server, a database server, a hub, a firewall, an intrusion detection/prevention (IDP) device and/or any other type of networking equipment or device that facilitates the transfer of data to and from devices 110. Network 104 includes routers 106, which communicate using various protocols, such as the Border Gateway Protocol and the Internet Control Message Protocol, in order to exchange routing, network configuration information, and other information. The network may be a local area network ("LAN"), such as a token ring or Ethernet network, a virtual local area network ("VLAN"), or another type of network. The network may comprise one or more wired or wireless links. For example, network 104 may be an Ethernet network that comprises one or more Ethernet cables. In another example, the network may be a Wireless Fidelity ("Wi-Fi") network that uses wireless radio transmissions to communicate information. In another example, network 104 may be a mobile network. Although shown as a single network 104 in FIG. 1, network 104 may comprise any number of interconnected networks, either public or private, in which the various networks interconnect to form one or more virtual networks.

Network 104 provides a variety of resources that may be accessed by devices 110. In the example of FIG. 1, network 104 includes content server 112 that stores or otherwise sources content, which, as the term is used herein, refers to any data commonly transmitted and/or stored within a network, such as web-based applications, images, documents, web pages, video data, audio data such as voice, web-based games, scripts, or any other type of network-based content. Network 104 may support multicast techniques to improve the delivery efficiency of data transmitted with the network. Typically network 104 will also connect to a variety of other types of devices (e.g., file servers, printers, telephones, and e-mail and other application servers). Network 104 is also shown coupled to public network 114 (e.g., the Internet) via router 106B. Public network 114 may include, for example, one or more client computing devices. Public network 114 may provide access to web servers, application servers, public databases, media servers, end-user devices, and many other types of network resource devices and content.

Network 104 may transmit content to devices 110 through router 106A using one or more packet-based protocols, such as an Internet Protocol (IP)/Transmission Control Protocol (TCP). In this respect, network 104 may support the transmission of data via discrete data units, often referred to as "packets." As a result, network 104 may be referred to as a "packet-based" or "packet switched" network. While described in this disclosure as transmitting, conveying, or otherwise supporting packets, network 104 may transmit data according to any other discrete data unit defined by any other protocol, such as a cell defined by the Asynchronous Transfer Mode (ATM) protocol, or a datagram defined by the User Datagram Protocol (UDP).

Network traffic delivered by network 104 may be classified according to a number of categories. For instance, content server 112 may stream live video to one of devices 110 through router 106A. Packets that transmit such video may be classified as streaming multimedia packets. Content server 112 may also send web pages to one of devices 110 using HTTP packets. As another example, information exchanged by routers 106 may be categorized as network management traffic. In addition to being classified by application, network traffic may be classified by source or destination, user, protocol, and port (for TCP and UDP), among others characteristics.

Various categories of network traffic may require a certain level of network performance. For example, streaming multimedia may require guaranteed bandwidth to provide an acceptable user experience. As another example, network management traffic should experience low delays in order to maintain the efficiency of a network. Also, internet service providers (ISPs) may prioritize traffic for certain users over others based on a service provider agreement. To meet these requirements, network 104 includes mechanisms to support quality of service (QoS) guarantees according to a number of predefined QoS levels.

Routers 106 receive, analyze, and classify packets to assign the packets to a suitable priority level. In addition to classifying packets, routers 106 process the received and classified packets according to their priority level. In this manner, routers 106 implement aspects of the QoS guarantees provided by network 104. In addition, based on information received from other devices in system 102, routers 106 determine the appropriate route through the system for each received packet and forwards the packet accordingly.

Routers 106 may regulate a speed at which packets are transmitted to prevent flooding on the network. For example, routers 106 may include a token bucket shaper that spends "tokens" to dequeue a corresponding amount of bytes from a queue and transmit them over the network, and may not transmit packets if the token bucket shaper has insufficient tokens to spend. In other words, each token may correspond to a number of bytes that the token bucket shaper is permitted to dequeue from the queue and transmit over the network. In this way, the token bucket shaper acts to regulate the speed at which packets are removed from the queue and transmitted on the network.

Routers 106 may use a Delay Bandwidth Buffer (DBB) as the primary storage for packets. The delay bandwidth buffer for network devices may include, for example, local memory, such as, for example, On Chip Memory (OCM) and may be further increased using an external memory, such as, for example, High Bandwidth Memory (HBM). The delay bandwidth buffer provides buffering for bandwidth matching between faster senders and slower receivers, such as those using Transmission Control Protocol (TCP). However, as port speeds increase, external memory bandwidth may no longer support the full packet rate in all cases, e.g., it may only provide half the line rate bandwidth. To compensate, a faster, but much smaller, on chip memory may be included as part of the delay bandwidth buffer, also referred to, for example, as a "hybrid memory." The hybrid memory may be capable of line rate performance when packets utilize the on chip memory, but may only be capable of a fraction of line rate when utilizing external memory. When a sufficient number of packets utilize the on chip memory, e.g., more than 50% in the case of external memory having half of line rate performance, and the remainder fits within the available external memory bandwidth, line rate performance is possible. If too many packets utilize the bandwidth constrained external memory, such that it becomes bandwidth oversubscribed, then performance degrades, possibly to the level of the external memory bandwidth limitation.

Some network devices (e.g., routers) may select between local memory and external memory using only a length of the queue, also referred to herein as queue length or simply "Qlength." However, while shallow queues (e.g., small Qlength) often have a shorter lifetime (e.g., a duration the packet is stored in the queue) than deep queues, queue length alone is not always a good predictor of lifetime. For example, a first packet stored in a deep queue with a relatively fast dequeue rate may have a shorter lifetime than a second packet stored in a shallow queue with a relatively slow dequeue rate. As such, such network devices may store the first packet, with the relatively short lifetime, in external memory and store the second packet, with the relatively long lifetime, in local memory, which may result in an undesirable reduction of line rate performance of the network device.

Accordingly, rather than relying solely on a queue length, the techniques of the disclosure describe a queueing system for a routers 106 that may select between local memory and external memory using a predicted lifetime. Predicted lifetime may refer to a time a packet expects to be resident in the delay bandwidth buffer. Routers 106 may store packets with a "short" predicted lifetime (e.g., packets written and read quickly in time) in local memory and store packets with a "long" predicted lifetime (e.g., packets written, but read much later in time compared to packets with a short lifetime) in external memory. For example, the queueing system for router 106A may predict queue latency by measuring the queue length and the dequeue rate, also referred to herein as "DQrate" (e.g., transmit rate) of the queue. The latency measure may refer to the time a packet is expected to be resident in the queue.

Routers 106 may each include a queueing system configured to select between local memory and external memory using a predicted lifetime to help to avoid unnecessarily wasting external memory bandwidth for packets that might otherwise be better suited to use local memory (e.g., packets having short lifetimes) compared to queueing systems that use only queue length. In some examples, routers 106 may each include a queueing system configured to select between local memory and external memory using a predicted lifetime to help to avoid unnecessarily wasting local memory capacity for packets that might be better suited for external memory compared to queueing systems that use only queue length. In some examples, routers 106 may each include a queueing system configured to select between local memory and external memory using a predicted lifetime to help to maintain a quality of service by respecting queue priority and/or manage move thresholds independently.

More specifically, for example, router 106A determines a predicted lifetime for each incoming network packet using a dequeue rate. In this example, router 106A stores the network packet in local memory or external memory based on the predicted lifetime of respective network packets. Router 106A stores network packets with relatively long predicted lifetimes in external memory and stores network packets with relatively short predicted lifetimes in local memory. In this way, router 106 is likely to store packets with a "short" lifetime (e.g., packets written and read quickly in time) in local memory compared to packets with a "long" lifetime (e.g., packets written, but read much later in time compared to packets with a short lifetime).

Although the principles described herein are discussed with reference to routers 106, other network devices, such as, for example, but not limited to, an Asynchronous Transfer Mode (ATM) switch, a local area network (LAN) switch, an interface card, a gateway, a firewall, or another device of system 102 may determine a predicted lifetime.

Figure 2:
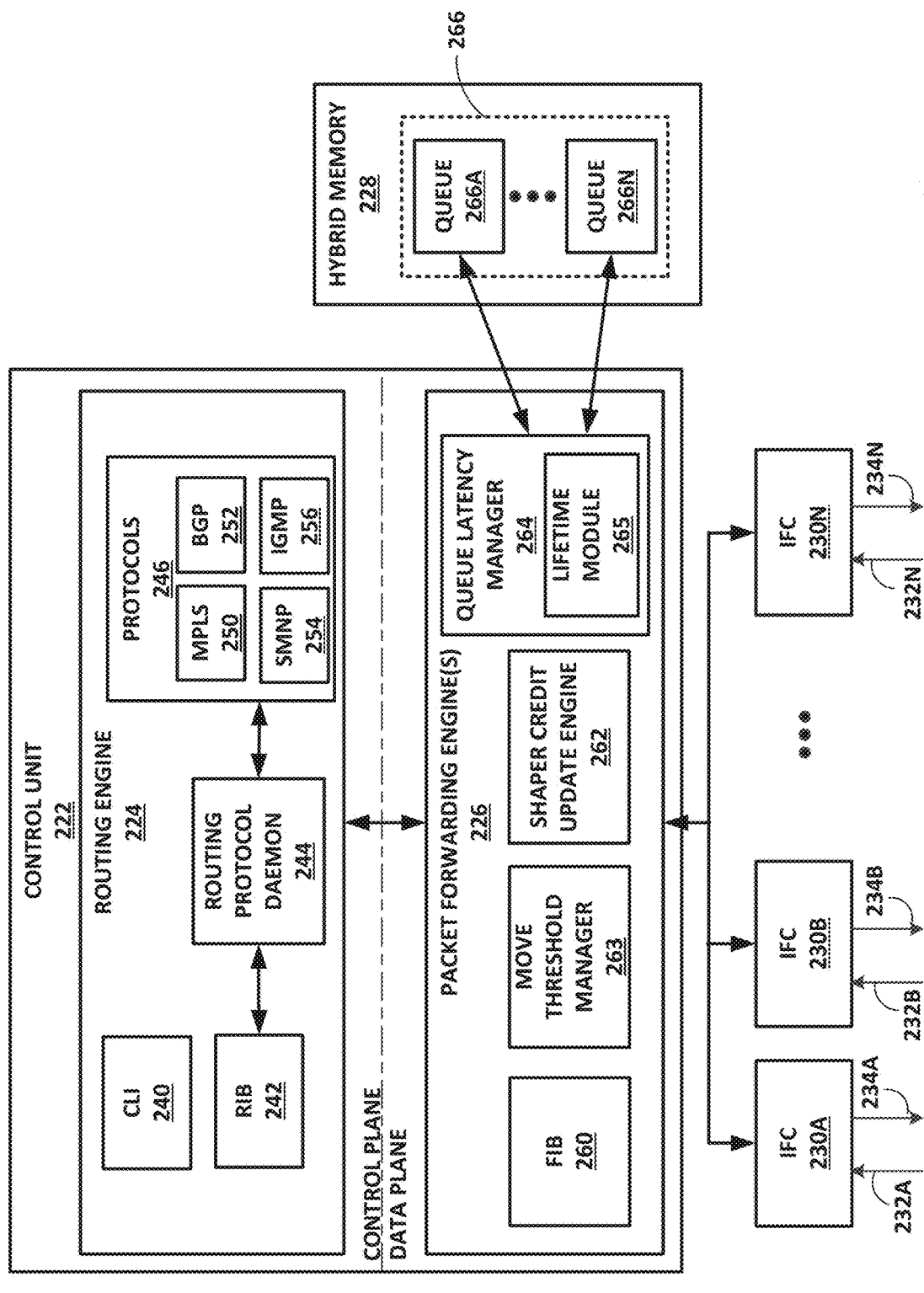
FIG. 2 is a block diagram illustrating an example router within the network of FIG. 1 in accordance with the techniques of the disclosure.

FIG. 2 is a block diagram illustrating an example router within the network of FIG. 1 in accordance with the techniques of the disclosure. In general, router 206 may operate substantially similar to routers 106 of FIG. 1. In this example, router 206 includes interface cards 230A-230N ("IFCs 230") that receive packets via incoming links 232A-232N ("incoming links 232") and send packets via outbound links 234A-234N ("outbound links 234"). IFCs 230 are typically coupled to links 232, 234 via a number of interface ports. Router 206 also includes a control unit 222 that determines routes of received packets and forwards the packets accordingly via IFCs 230, and hybrid memory 228 in communication with control unit 222.

Control unit 222 includes a routing engine 224 and a packet forwarding engine 226. Routing engine 224 operates as the control plane for router 206 and includes an operating system (not shown) that provides a multi-tasking operating environment for execution of a number of concurrent processes. Routing engine 224, for example, executes software instructions to implement one or more control plane networking protocols 246. For example, protocols 246 may include one or more routing protocols, such as BGP 252, for exchanging routing information with other routing devices and for updating routing information base (RIB) 242. Protocols 246 may further include transport protocols, such as Multiprotocol Label Switching (MPLS) protocol 250, and multicast management protocols, such as Internet Group Management Protocol (IGMP) 256. In other examples, protocols 246 may include other routing, transport, management, or communication protocols.

In some examples, routing engine 224 includes command line interface (CLI) 240 to permit an administrator to configure and/or manage router 206. For example, the administrator may, via CLI 240, access queue latency manager 264 to configure one or more parameters of queues 266A-266N ("queues 266"). In another example, routing engine 224 includes a graphical user interface (GUI) instead of a CLI. In a still further example, routing engine executes Simple Network Management Protocol (SMNP) 254 to permit the administrator to configure and/or control router 206 from a remote terminal.

Routing protocol daemon (RPD) 244 may execute BGP 252 or other routing protocols to update RIB 242. RIB 242 describes a topology of the computer network in which router 206 resides, and also includes routes through the computer network. RIB 242 describes various routes within the computer network, and the appropriate next hops for each route, i.e., the neighboring routing devices along each of the routes. RPD 244 analyzes information stored in RIB 242 and generates forwarding information for packet forwarding engine 226, which stores the forwarding information in forwarding information base (FIB) 260.

Hybrid memory 228 acts as storage for router 206. As shown, hybrid memory 228 may include local memory (e.g., on chip memory) and external memory (e.g., High Bandwidth Memory—HBM). In accordance with the techniques of the disclosure, hybrid memory 228 may store queues 266 for router 206. In some examples, hybrid memory 228 comprises random access memory (RAM), read only memory (ROM), programmable read only memory (PROM), erasable programmable read only memory (EPROM), electronically erasable programmable read only memory (EEPROM), flash memory, comprising executable instructions for causing the one or more processors to perform the actions attributed to them.

Each of queues 266 of hybrid memory 228 may be a first-in first-out (FIFO) data structure for organization and temporary storage of data. In the example of FIG. 2, queues 266 store one or more packets for router 206. In one example where router 206 includes more than one packet forwarding engine, router 206 stores the one or more packets in one or more queues 266 prior to switching internally between packet forwarding engines. In another example, router 206 stores the one or more packets in one or more queues 266 prior to transmitting the packets over the network.

Packet forwarding engine 226 operates as the data plane for router 206 and includes FIB 260, shaper credit update engine 262, move threshold manager 263, and queue latency manager 264. Packet forwarding engine 226, for example, processes packets forwarded and received by router 206 via IFCs 230. For example, packet forwarding engine 226 may apply filters and routing policies to outgoing packets and forward the packets to a next hop in the network. In some examples, control unit 222 includes a plurality of packet forwarding engines, each of which are configured to operate similar to packet forwarding engine 226 to provide packet forwarding functions for different flows of network traffic.

FIB 260 may associate, for example, network destinations for network traffic with specific next hops and corresponding IFCs 230 and physical output ports for output links 234. FIB 260 may be a radix tree programmed into dedicated forwarding chips, a series of tables, a complex database, a link list, a radix tree, a database, a flat file, or various other data structures. In some examples, FIB 260 includes lookup structures. Lookup structures may, given a key, such as an address, provide one or more values. In some examples, the one or more values may be one or more next hops. A next hop may be implemented as microcode, which when executed, performs one or more operations. One or more next hops may be "chained," such that a set of chained next hops perform a set of operations for respective different next hops when executed. Examples of such operations may include applying one or more services to a packet, dropping a packet, and/or forwarding a packet using an interface and/or interface identified by the one or more next hops.

Queue latency manager 264 of packet forwarding engine 226 may work with shaper credit update engine 262 and move threshold manager 263 to perform management functions for queues 266 in accordance with techniques of this disclosure. For example, shaper credit update engine 262 may implement token bucket shaper data structures to determine dequeue rates for queues 266. In this example, queue latency manager 264 regulates the flow of packets from a respective one of queues 266, e.g., queue 266A using the dequeue rates specified by shaper credit update engine 262. Shaper credit update engine 262 is described further with reference to FIG. 3.

As port speeds increase, external memory bandwidth may no longer support the full packet rate in all cases, e.g., it may only provide half the line rate bandwidth. To compensate, a faster, but much smaller, local memory of hybrid memory 228 may be included as part of the delay bandwidth buffer, also referred to, for example, as a hybrid memory. Hybrid memory 228 may be capable of line rate performance when packets utilize the local memory, but may only be capable of a fraction of line rate when utilizing external memory. When a sufficient number of packets utilize the local memory, e.g., more than 50% in the case of external memory having half of line rate performance, and the remainder fits within the available external memory bandwidth, line rate performance is possible. If too many packets utilize the bandwidth constrained external memory, such that external memory becomes bandwidth oversubscribed, then performance of hybrid memory 228 may degrade, possibly to the level of the external memory bandwidth limitation.

To help to prevent oversubscription of external memory, queue latency manager 264 may include lifetime module 265. Lifetime module 265 may predict a packet lifetime, for example, using one or more of a dequeue rate, target rate, latency, priority, congestion experienced, or other information. Lifetime module 265 is described further with reference to FIG. 7.

For example, queue latency manager 264 may initially store a packet in a local memory of hybrid memory 228. Lifetime module 265 may predict a packet lifetime. In this example, move threshold manager 263 may determine a move threshold for hybrid memory 228. Move threshold manager 263 may determine a move threshold as described further with reference to FIGS. 8-9. Queue latency manager 264 may use the move threshold and the predicted lifetime to select which memory (e.g., local memory or external memory) to store the packet. For example, in response to determining that a predicted lifetime for a packet is less than a move threshold, queue latency manager 264 may store the packet in local memory of hybrid memory 228. In this example, in response to determining that a predicted lifetime for a packet is greater than the move threshold, queue latency manager 264 may store the packet in external memory of hybrid memory 228.

Figure 3:
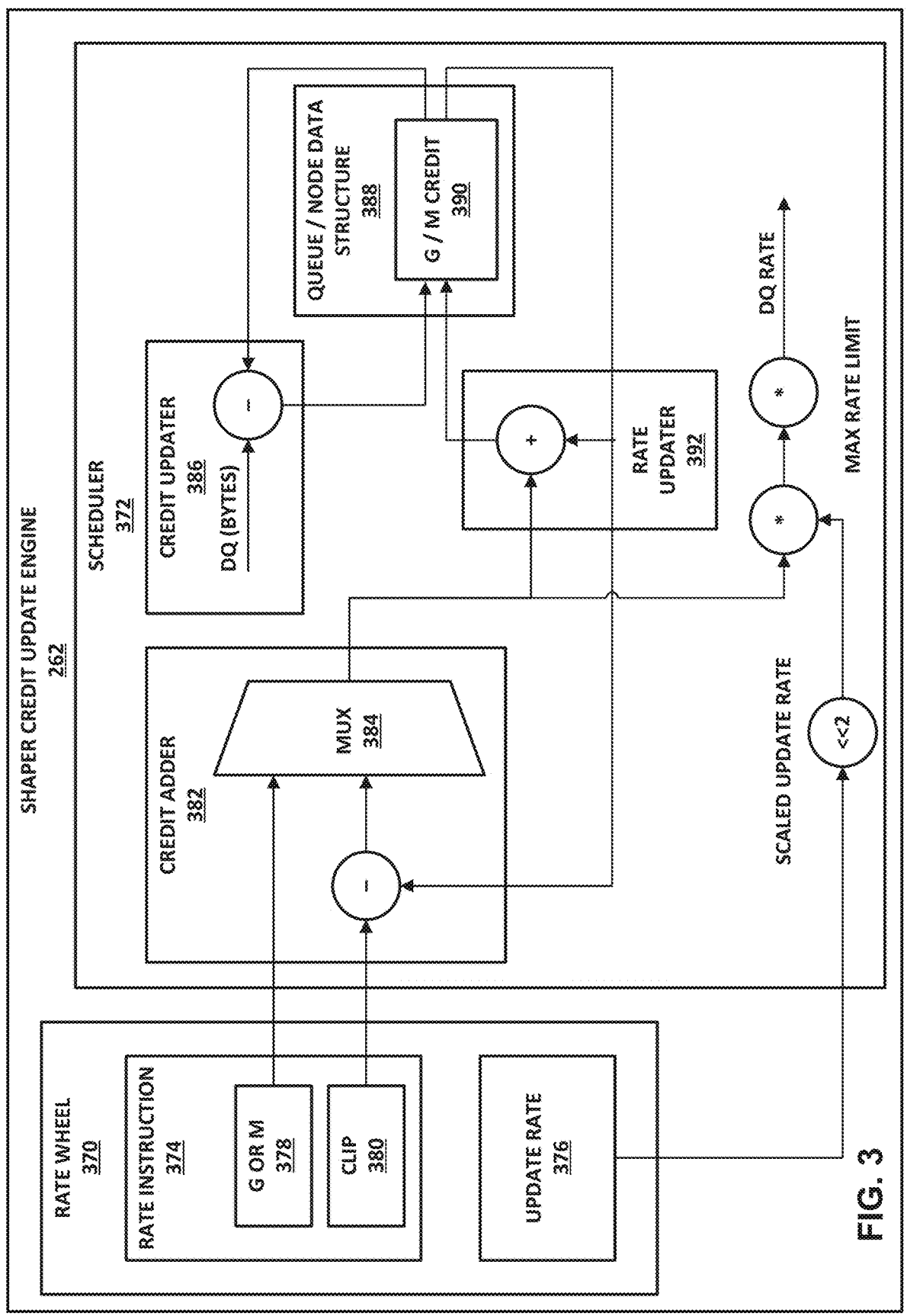
FIG. 3 is a block diagram illustrating an example shaper credit update engine within the router of FIG. 2 in accordance with the techniques of the disclosure.

FIG. 3 is a block diagram illustrating an example shaper credit update engine 262 of FIG. 2 in accordance with the techniques of the disclosure. In one example implementation, shaper credit update engine 262 includes rate wheel 370 and scheduler 372. Again, network devices may include shaper credit update engine 262 to regulate a speed at which packets are transmitted to prevent flooding on the network.

Moreover, lifetime module 265 may determine lifetime for a packet based on a dequeue rate output by shaper credit update engine 262.

Rate wheel 370 provides credit updates to scheduler 372. Scheduler 372 may use credits to determine when queue/node data structure 388 is permitted to transmit one or more bytes enqueued by queue/node data structure 388. In the example of FIG. 3, rate wheel 370 includes rate instruction 374 and update rate 376. Rate instruction 374 provides rate updates for "Guaranteed" (G) and "Maximum" (M) credit fields 378 to credit adder 382 of scheduler 372. G credits may be used to allocate a guaranteed amount of bandwidth to queue/node data structure 388, unless the G rate for the network is oversubscribed. M credits may be used as a rate limit to prevent queue/node data structure 388 from exceeding a specified average transmit rate.

In addition, update rate 376 represents a rate at which credits are being updated by rate wheel 370. Update rate 376 provides a normalized dequeuing rate to queue/node data structure 388. In the example of FIG. 3, update rate 376 is the inverse of a rate update period for rate wheel 370. In some examples, scheduler 372 applies a low-pass filter to smooth instantaneous changes in the dequeuing rate.

Scheduler 372 includes credit adder 382, credit updater 392, rate updater 386, and queue/node data structure 388. Credit adder 382 of scheduler 372, based on input from clip 380, provides additional credits to rate updater 392 using MUX 384, which in turn provides such additional G/M credits 390 to queue/node data structure 388. Depending on the value of the current credits and clip 380, rate updater 392 may add some, all, or none of the credits to G/M credits 390 of queue/node data structure 388. Scheduler 372 uses G/M credits 390 to determine when queue/node data structure 388 is permitted to transmit. In one example, when G/M credits 390 for queue/node data structure 388 are non-negative, scheduler 372 may dequeue or transmit packets from queue/node data structure 388. Upon dequeuing and transmitting the packets from queue/node data structure 388, credit updater 386 removes a corresponding number of credits from G/M credits 390 for queue/node data structure 388. Once G/M credits 390 for queue/node data structure 388 are negative, queue/node data structure 388 becomes ineligible for dequeuing or transmitting subsequent packets. Upon accumulating a non-negative value of G/M credits 390, queue/node data structure 388 again becomes permitted to dequeue or transmit packets.

Figure 4:
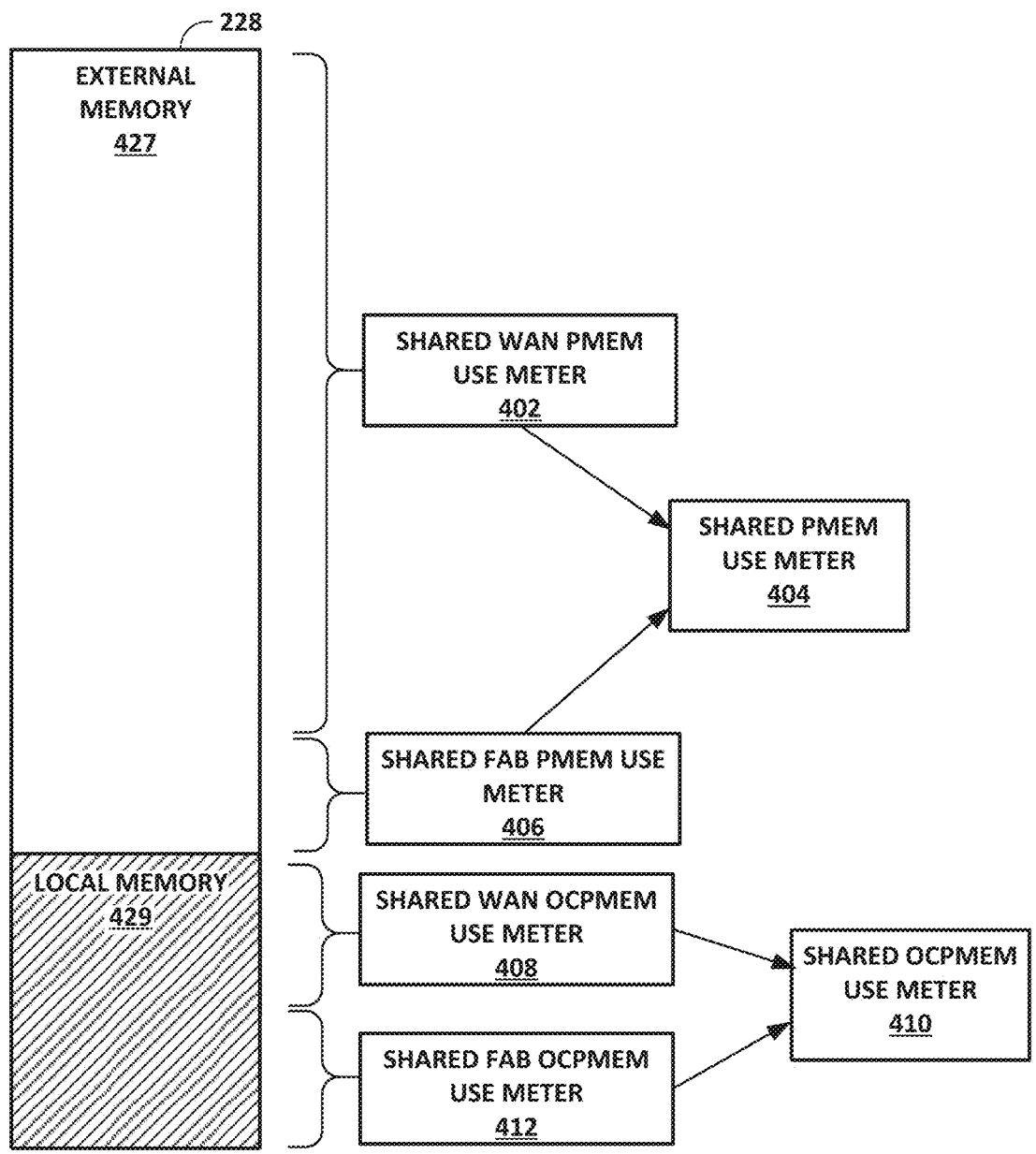
FIG. 4 is a block diagram illustrating an example memory within the router of FIG. 2 in accordance with the techniques of the disclosure.

FIG. 4 is a block diagram illustrating an example hybrid memory 228 within the router of FIG. 2 in accordance with the techniques of the disclosure. As shown, hybrid memory 228 may include local memory 429 which is full bandwidth. Moreover, hybrid memory 228, also referred to herein as "delay bandwidth buffer," or simply "DBB," may further include external memory 427 to permit large delay bandwidth buffer requirements, such as, for example, delays as large as 100 milliseconds. For example, local memory 429 may be contained in on chip memory, also referred to as "On Chip Packet memory" or simply "OCPmem." In this example, local memory 429 is at full bandwidth, meaning local memory 429 will enqueue and dequeue at line rate. Queue latency manager 264 may use external memory 427, which may be less than full bandwidth. However, because local memory 429 is relatively small compared to external memory 427, queue latency manager 264 may use local memory 429 for only the shortest "lifetime" packets. In comparison to local memory 429, external memory 427 is relatively large. As such, queue latency manager 264 may use external memory 427 for longer "lifetime" packets. Local memory 429 may be, for example, about $\frac{1}{100}$th or less the size of external memory 427. The delay bandwidth buffer is a function of memory size and transmit rate, and lower transmit rates have larger delay bandwidth buffer.

FIG. 4 illustrates the organization of local memory 429 and external memory 427 for the delay bandwidth buffer. The delay bandwidth buffer portion of external memory 427 has a global or shared is packet memory use meter 404, also referred to as simply "shared Pmem use meter" 404, which indicates the amount of external memory 427 in use. As used herein, shared memory may refer to instances where memory is used by multiple queueing systems, which are referred to herein as simply "Qsys." Shared Pmem use meter" 404 memory may include multiple fabric Qsys, which is illustrated as "shared fabric use meter" 406, which may represent fabric utilization" and multiple WAN Qsys, which is illustrated as "WAN Pmem use meter" 402, which may represent wide-area-network (WAN) queue system utilization. The WAN Qsys may be used to schedule packets for ports, e.g., 100GE.

Similarly, FIG. 4 illustrates a "Shared" use meter for WAN 408 and a shared use meter for fabric 412, as well as the total combined use meter 410 for local memory 429. Shared WAN OCPmem use meter 408 may further include multiple Local or Individual OCPmem use meters, one per WAN Qsys. In accordance with techniques described herein, packets for queues with a smaller lifetime (e.g., latency) may utilize local memory 429 and those with larger lifetime may utilize external memory 427.

Figure 5:
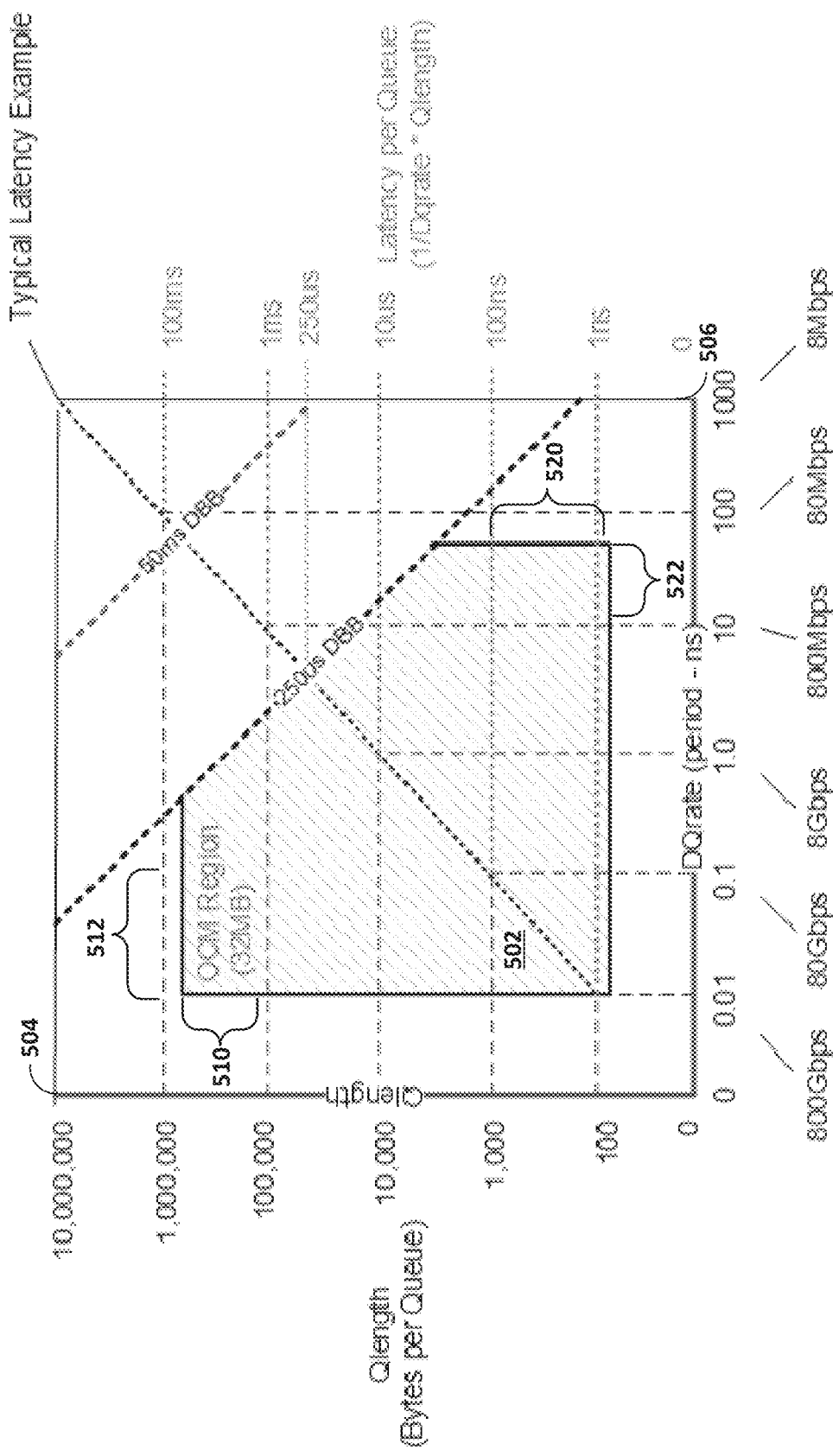
FIG. 5 is a conceptual diagram illustrating latency in accordance with the techniques of the disclosure.

FIG. 5 is a conceptual diagram illustrating latency in accordance with the techniques of the disclosure. Queue length 504, also referred to herein as "Qlength," indicates a number of packets in a queue. Dequeue rate 506, also referred to herein as "DQrate," indicates the rate of packet travel through the queue. Lifetime module 265 may predict lifetime using dequeue rate 506 (and other factors) when assigning a "time value" or "lifetime" to a packet when making a move decision. In cases where latency is not computable, or not yet reliable, e.g., an empty queue, lifetime module 265 may assign a predicted lifetime using predictors, such as prior dequeue rate, target rate, priority, and congestion experienced (e.g., not transmitting at configured rate).

FIG. 5 illustrates a shaded region 502 that is representative of the types of packets that are stored in local memory 429 of FIG. 4. As shown, FIG. 5 illustrates dequeue rate along the abscissa axis (e.g., horizontal axis) with dequeue rate increasing from right to left and queue length along the ordinate axis (e.g., vertical axis) with queue length increasing from bottom to top.

Packets with "short" lifetime may utilize local memory 429 and packets with increasing lifetime move to external memory 427. FIG. 5 illustrates that deep queues (e.g., queue lengths 510) with a high dequeue rate (e.g., dequeue rates 512) may produce short lifetimes as well as shallow queues (e.g., queue lengths 520) with low dequeue rate (e.g., dequeue rates 522). While there is room in local memory 429 (e.g., use meters not approaching full) the predicted lifetime techniques described herein allow for packets with short lifetimes to remain in local memory 429. This preserves external memory 427 bandwidth for other longer lifetime packets, and avoids oversubscribing the external memory 427 bandwidth.

Figure 6:
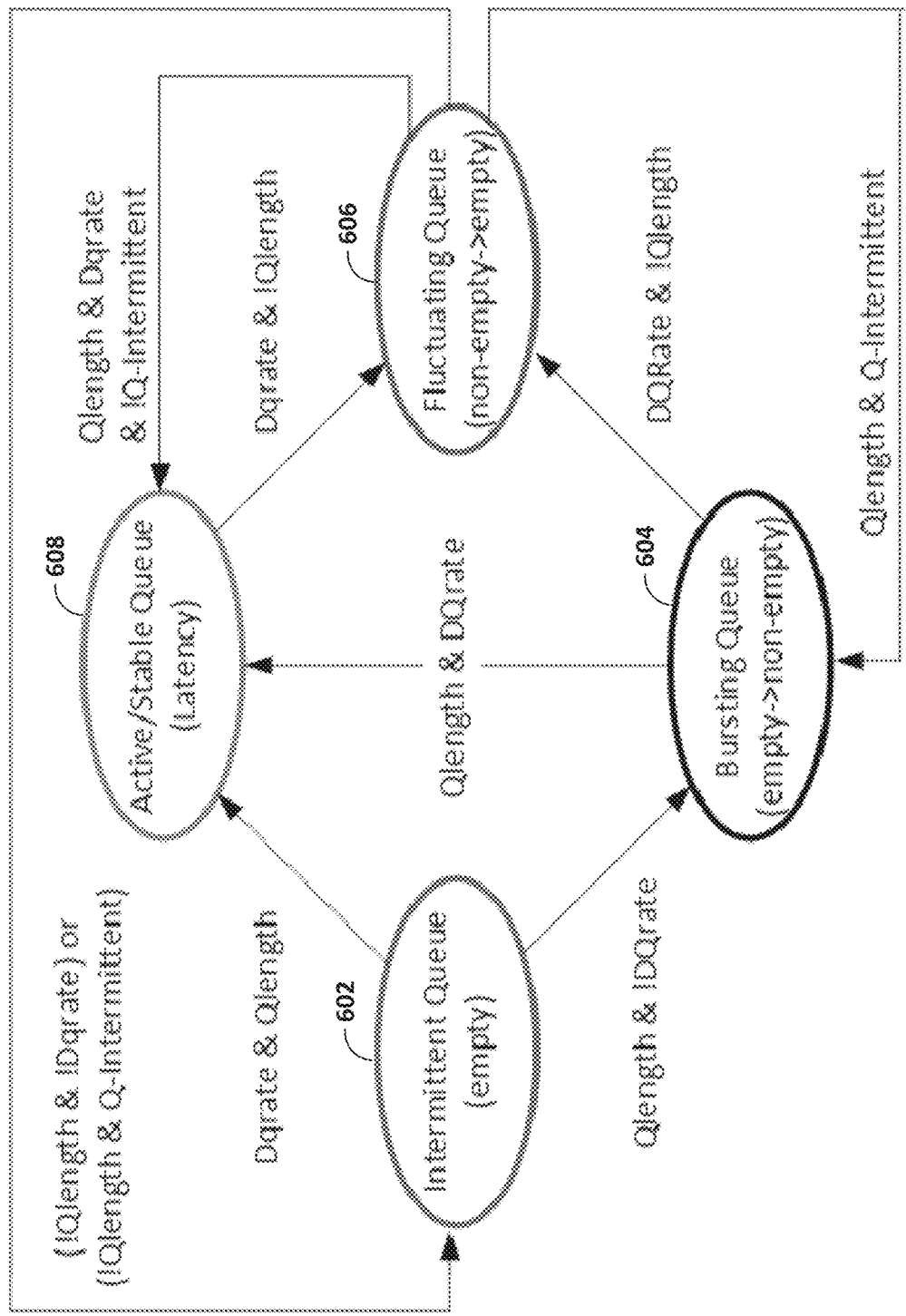
FIG. 6 is a state diagram illustrating queue states in accordance with the techniques of the disclosure.

FIG. 6 is a state diagram illustrating queue states in accordance with the techniques of the disclosure. Lifetime module 265 may use separate lifetime look-up tables (LUTs) for each state for a queue. In this example, the predicted lifetime LUTs comprises (4) separate LUTs that are selected based on queue length (e.g., Qlength), dequeue rate (e.g., DQrate), and queue intermittency.

In intermittent or empty queue state 602 (e.g., no dequeue rate and no queue length), the queue may be empty or have a small amount of bytes, with no dequeue rate or small dequeue rate. For example, lifetime module 265 may select intermittent queue state 602 from a plurality of queue states for the queue when a sampled dequeue rate for the queue does not exceed a threshold dequeue rate and when a queue length for the queue does not exceed a threshold queue length. Intermittent queue state 602 may indicate a queue that is empty and receiving bytes for first time since last Queue Rate Update (QRU). Lifetime module 265 may set thresholds to filter out small transients. Intermittent queue state 602 may be configured to have a bias toward smaller latency to keep packets in local memory 429. For example, a predicted lifetime LUT for intermittent queue state 602 may weigh factors to output lower lifetimes compared to states 604-608. Lifetime values can be generated using the target rate to differentiate between configured high speed and low speed queues, so that higher speed queues receive a relative lower lifetime (e.g., latency) value than lower speed queues.

In bursting qlength queue state 604, the dequeue rate is 0 or small in previous queue rate update period, suggesting the queue may be bursting from empty to non-empty or is congested and cannot transmit. For example, lifetime module 265 may select an bursting queue state from a plurality of queue states for the queue when a sampled dequeue rate for the queue does not exceed a threshold dequeue rate and when a queue length for the queue exceeds a threshold queue length. In some examples, the queue may be moving from intermittent queue state 602 to bursting queue state 604 as the qlength exceeds a qlength threshold. In bursting queue state 604, when queue length grows beyond a point, e.g., two or three maximum transmission units (MTUs), lifetime module 265 may set the latency to a relatively large value to move packets onto external memory 427. Moving packets onto external memory 427 may help to handle the congested queue case, but allows some amount bursting before transitioning to active queue state 608. In bursting queue state 604, if instead a queue is non-congested, it will likely transition to active queue state 608 in a next QRU period and have a dequeue rate. Lifetime may be assigned values using target latency (Qlength/target rate). In some example Qlength may be used to generate lifetime values, assuming a transmission rate.

In fluctuating queue state 606, also referred to herein as "transient queue state," the queue is presently empty, or near empty, but transmitted some bytes at the dequeue rate during last QRU period (e.g., lifetime module 265 may predict the number of bytes by knowing the QRU period). For example, lifetime module 265 may select fluctuating queue state 606 from a plurality of queue states for the queue when a sampled dequeue rate for the queue exceeds a threshold dequeue rate and when a queue length for the queue does not exceed a threshold queue length. In fluctuating queue state 606, the queue may intermittently receive packets. In fluctuating queue state 606, lifetime module 265 may determine the latency using the amount of bytes sent (e.g., DQrate*QRU period) in prior QRU period. In fluctuating queue state 606, lifetime module 265 may remain in local memory 429 until transitioning to either active queue state 608 or queue length Region. Lifetime values may be assigned using DQrate in some example, in other examples when Q-Intermittent is set, indicating a queue that went empty to non-empty, the queue may transition to intermittent queue state 602 or bursting queue state 604.

In active queue state 608 (e.g., dequeue rate and queue length), the queue has a computable latency using dequeue rate and queue length. For example, lifetime module 265 may select active queue state 608 from a plurality of queue states for the queue when a sampled dequeue rate for the queue exceeds a threshold dequeue rate and when a queue length for the queue exceeds a threshold queue length. In some examples, lifetime module 265 may transition to bursting queue state 604 when queue length is empty.

The state diagram of FIG. 6 illustrates a transition between four states as packets arrive and depart and queues become non-empty and empty again. Intermittent queue state 602 is associated with a previously empty queue. Fluctuating queue state 606 may be generally associated with a queue transitioning to and from empty. Bursting queue state 604 may be generally associated with a queue transitioning from empty to non-empty. Active queue state 608 may be generally associated with queues that have a moderate queue length and are transmitting due to having a dequeue rate.

An empty queue usually enters at the intermittent queue state 602. Lifetime module 265 may transition to active queue state 608 or bursting queue state 604 depending on when a dequeue occurs (that produces a dequeue rate). Lifetime module 265 may transition from active queue state 608 to fluctuating queue state 606 when going empty (e.g., dequeue transmitted all of the bytes). Lifetime module 265 may transition from bursting queue state 604 to active queue state 608 once dequeue occurs and dequeue rate is produced.

Example thresholds and lifetime select LUT thresholds are illustrated in Table 1.

TABLE 1

Threshold and Lifetime Select LUT (Thresholds)

| HiPri | Q-Int | Qlength Threshold | Dqrate Threshold |
|---|---|---|---|
| 1 | 1 | HIGH (for increased) Burst | LOW |
| 1 | 0 | HIGH (for increased) Burst | LOW |
| 0 | 1 | LOW | HIGH (force select regions 00 and 10) |
| 0 | 0 | LOW | LOW |

In Table 1, a "Hi-Pri" value of '1' represents a high priority packet and a Hi-Pri value of '0' represents a low or normal priority packet and a "Q-int" value of '1' represents a queue intermittent state has occurred and a Q-int value of '0' represents a queue intermittent state has not occurred. In Table 1, for a high priority packet and when a queue intermittent state has occurred, lifetime module 265 selects a high Qlength threshold (for increased burst) and a low the DQrate threshold. Additionally, in Table 1, for a high priority packet and when a queue intermittent state has not occurred, lifetime module 265 selects a high Qlength threshold (for increased burst) and a low the DQrate threshold. Additionally, in Table 1, for a low priority packet and when a queue intermittent state has occurred, lifetime module 265 selects a low Qlength threshold and a high the DQrate threshold. For instance, for a low priority packet and when a queue intermittent state has occurred, lifetime module 265 force selects empty intermittent region (e.g., region 00) and bursting region (e.g., region 10). Additionally, in Table 1, for a low priority packet and when a queue intermittent state has not occurred, lifetime module 265 selects a low Qlength threshold and a low the DQrate threshold.

Example lifetime LUT inputs and lifetime LUT outputs are illustrated in Table 2.

TABLE 2

| Queue Regions | Lifetime LUT Input | Lifetime LUT Output |
| --- | --- | --- |
| ACTIVE Qlength and Dqrate above Thresholds | Dqrate Latency | Latency computed from DQrate and Qlength |
| QLENGTH Qlength ONLY above Threshold | Target Latency Queue Length | Latency computed from Target Rate and Qlength Latency LUT using Qlength as Index and SW defined "Maximum Rate" |
| DQRATE Dqrate ONLY above Threshold | DQrate | Latency LUT using DQrate as Index and SW defined "Minimum Qlength" |
| EMPTY Qlength and Dqrate below Thresholds | Target Rate | Latency using Target Rate as Index and SW defined "Threshold Qlength" |

In Table 2, ACTIVE corresponds to active queue state 608, QLENGTH corresponds to bursting queue state 604, DQRATE corresponds to fluctuating queue state 606, and EMPTY corresponds to intermittent queue state 602. In Table 2, the LUT input in active queue state 608 is "Dqrate Latency" and lifetime module 265 computes the latency from DQrate and Qlength. Additionally, in Table 2, the LUT input in bursting queue state 604 is target latency and lifetime module 265 computes the latency from a target rate and Qlength or the LUT input is Queue length and the latency LUT uses Qlength as an index and a software (SW) defined maximum rate. Additionally, in Table 2, the LUT input in fluctuating queue state 606 is DQrate and lifetime module 265 computes the latency using DQrate as an index and software defined minimum Qlength. Additionally, in Table 2, the LUT input in intermittent queue state 602 is the target rate and lifetime module 265 computes the latency using the target rate as an index and software defined threshold Qlength.

Lifetime module 265 may be configured with separate queue length and dequeue rate thresholds that in combination select one of four queue state LUTs. The thresholds may filter small values of queue length and dequeue rate, and may scale based on queue priority (e.g., higher priority may have higher threshold and lower priority lower threshold so that high priority can have a larger "burst tolerance" when queue is empty or below Qlength threshold. For example, when a queue is empty and packets arrive and start filling the queue in a burst, lifetime module 265 may use a fixed lifetime up to the Qlength threshold, which is set to a large value, for example, but not limited to, 10 kilobytes (kB), and then transition from EMPTY to QLENGTH region using target latency or to ACTIVE region using DQrate Latency when DQrate is available. The fixed lifetime value comes from a separate region in the lifetime LUT selected by high priority. This allows high priority to receive a burst using local memory, but if the high priority is oversubscribed, e.g., too much traffic on a port, and the high priority queue begins to build, and the high priority queue may exceed the Qlength threshold, then lifetime module 265 may begin to shift high traffic for the priority queue to external memory as the Qlength grows, which may happen once in bursting queue state 604 or active queue state 608.

Figure 7:
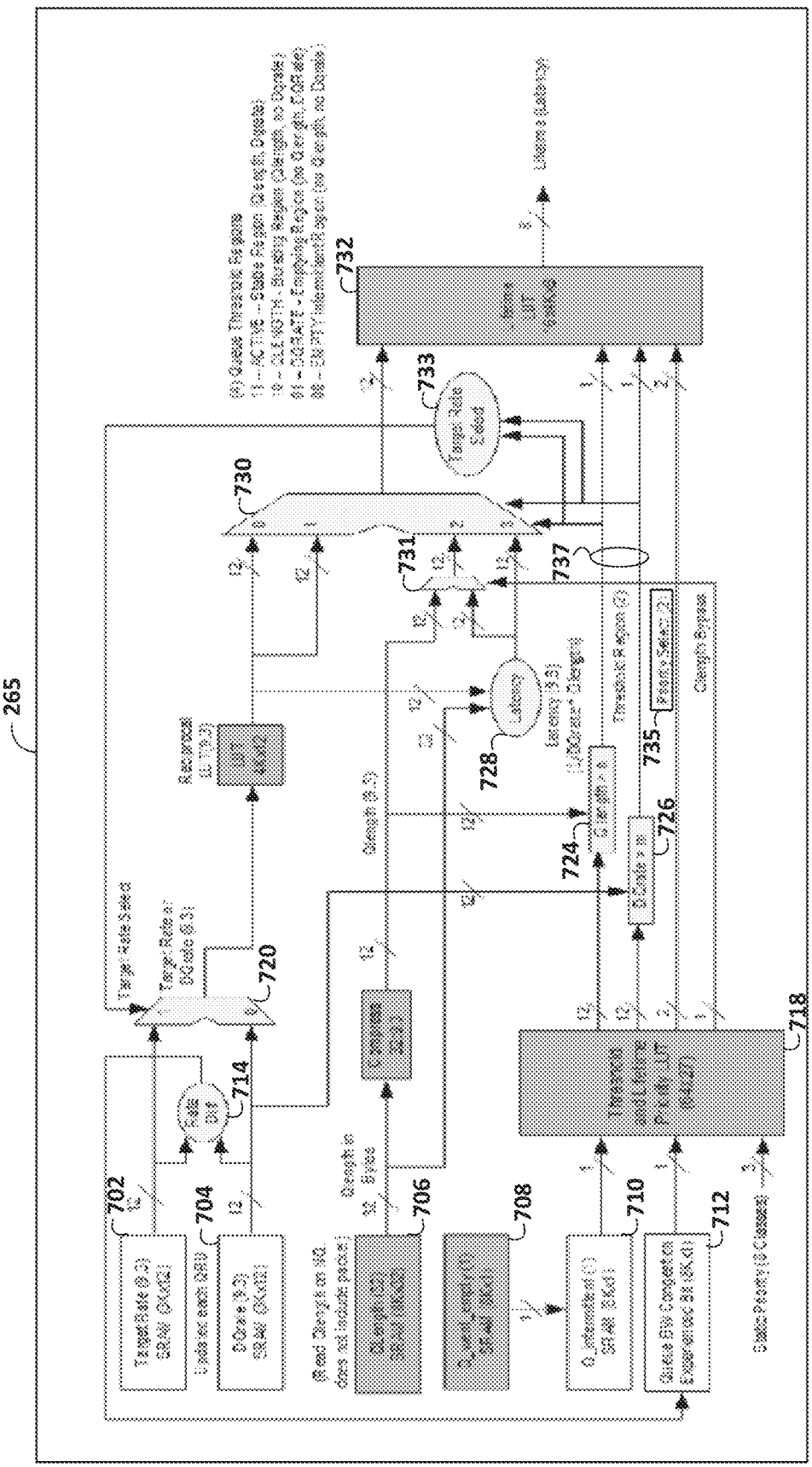
FIG. 7 is a block diagram illustrating an example queue latency manager within the router of FIG. 2 in accordance with the techniques of the disclosure.

FIG. 7 is a block diagram illustrating an example lifetime module 265 within queue latency manager 264 of the router of FIG. 2 in accordance with the techniques of the disclosure. Lifetime module 265 is configured to determine a predicted lifetime of a packet received by the router for use in determining whether to store the packet in a local memory or an external memory. As shown, lifetime module 265 may receive target rate 702, sampled dequeue rate 704, queue length 706. Target rate 702 may be a predetermined target rate. Sampled dequeue rate 704 may be a current sampled dequeue rate. Target rate 702 may be used in place of sampled dequeue rate 704 when sampled dequeue rate 704 is not stable (e.g., is less than a threshold). As shown, rate difference module 714 may receive an indication of target rate 702 and sampled dequeue rate 704 and output a queue congestion experienced bit 712 indicating whether queue congestion is experienced. Rate difference module 714 may compare target rate 702 with sampled dequeue rate 704 and when a large enough difference is detected, set queue congestion experienced bit 712. Queue congestion experienced bit 712 may be set when sampled dequeue rate 704 is less than target rate 702. Lifetime module 265 may use queue length 706 for packets received in a bursting queue state.

Initially, LUT module 718 may be configured to select a threshold dequeue rate based on whether queue congestion is experienced. A congestion region is used for queues that are experiencing congestion, i.e., congestion experienced bit 712 is set. These queues are dropping packets due to either external memory bandwidth congestion, or have grown too large and are at Qlength based drop threshold, e.g., Tail Drop or Weighted Random Early Detection (WRED), and should therefore be biased to be moved to external memory. These queues would have a scaled larger lifetime, so they move to external memory before other similar but uncongested queues. For example, LUT module 718 may be configured to use a congestion LUT to select a threshold queue length 'n1' when queue congestion experienced bit 712 is set to a logical high value '1'. In this example, LUT module 718 may be configured to use a non-congestion LUT to select a threshold queue length 'n2' when queue congestion experienced bit 712 is set to a logical low value '0'. Similarly, LUT module 718 may be configured to use a congestion LUT to select a threshold dequeue rate 'm1' when queue congestion experienced bit 712 is set to a logical high value '1'. In this example, LUT module 718 may be configured to use a non-congestion LUT to select a threshold dequeue rate 'm2' when queue congestion experienced bit 712 is set to a logical low value '0'.

In some examples, LUT module 718 may be configured to select a threshold dequeue rate based on whether the queue length 706 went empty. Said differently, in some examples, LUT module 718 may force the threshold dequeue rate 'm' to max to select queue regions 00 (e.g., intermittent queue state) and 10 (e.g., bursting queue state) based on queue intermittent 710. For example, LUT module 718 may be configured to use a first LUT to select a threshold queue length 'n1' when Q_went_empty 708 is set to a logical high value '1'. In this example, LUT module 718 may be configured to use a second LUT to select a threshold queue length 'n2' when Q_went_empty 708 is set to a logical low value '0'. Similarly, LUT module 718 may be configured to use a first LUT to select a threshold dequeue rate 'm1' when Q_went_empty 708 is set to a logical high value '1'. In this example, LUT module 718 may be configured to use a second LUT to select a threshold dequeue rate 'm2' when Q_went_empty 708 is set to a logical low value '0'.

In some examples, LUT module 718 may be configured to select a threshold dequeue rate based on a priority. Said differently, for example, LUT module 718 may elevate threshold queue length 'n' for increased burst tolerance based on strict high priority. For example, LUT module 718 may be configured to use a first LUT to select a threshold queue length 'n1' for a first priority. In this example, LUT module 718 may be configured to use a second LUT to select a threshold queue length 'n2' for a first priority. Similarly, LUT module 718 may be configured to use a first LUT to select a threshold dequeue rate 'm1' for a first priority. In this example, LUT module 718 may be configured to use a second LUT to select a threshold dequeue rate 'm2' for a second priority.

Lifetime module 265 may determine a queue state. As shown, comparison module 724 compares queue length 706 to a threshold queue length 'n'. In this example, comparison module 724 outputs a logical high value '1' when queue length 706 exceeds the threshold queue length 'n'. Similarly, comparison module 726 compares sampled dequeue rate 704 to a threshold dequeue rate 'm'.

In this example, comparison module 726 outputs a logical high value '1' when sampled dequeue rate 704 exceeds the threshold dequeue rate 'm'. In this way, lifetime module 265 may determine a queue state using the outputs of comparison module 724 and comparison module 726. For example, lifetime module 265 may determine the queue state as active queue state 608 when comparison module 724 outputs a logical high value '1' and when comparison module 726 outputs a logical high value '1'.

In some examples, lifetime module 265 may determine the queue state as bursting queue state 604 when comparison module 724 outputs a logical high value '1' and when comparison module 726 outputs a logical low value '0'. In some examples, lifetime module 265 may determine the queue state as fluctuating queue state 606 when comparison module 724 outputs a logical low value '0' and when comparison module 726 outputs a logical high value '1'. In some examples, lifetime module 265 may determine the queue state as intermittent queue state 602 when comparison module 724 outputs a logical low value '0' and when comparison module 726 outputs a logical low value '0'.

Target rate seed 733 may generate a target rate select value to control multiplexer 720 based on the output of comparison module 724 and the output of comparison module 726. For example, target rate seed 733 may generate a logical high value '1' when sampled dequeue rate 704 is not stable (e.g., during an intermittent queue state).

Lifetime module 265 may select an input to be used by LUT module 732 based on the queue state. LUT module 732 may be configured to map floating point input formats to lifetimes, clip and scale input ranges to lifetime, and/or provide non-linear lifetimes as necessary. Lifetime module 265 may output a lifetime (e.g., 0 to 255) value with range from 0 to a maximum size of local memory. For example, multiplexer 730 may be configured to pass the output of multiplexer 720 as an input to LUT module 732 when intermittent queue state 602 and fluctuating queue state 606 are selected. Latency module 728 may be configured to output a target latency to be used for packets for a queue in a bursting queue state and/or emptying queues. As shown, multiplexer 730 may be configured to pass the output of latency module 728 as an input to LUT module 732 when active queue state 608 is selected. In some examples, multiplexer 730 may be configured to pass the output of multiplexer 731 as an input to LUT module 732 when bursting queue state 604 is selected. For instance, multiplexer 730 may be configured to pass the output of multiplexer 731 as an input to LUT module 732 for a high priority packet, which typically does not have a target rate associated with the packet. In this way, lifetime module 265 may help to move even high priority packets to external memory when oversubscribing a queue.

LUT module 732 may be configured to receive priority select information 735 from LUT module 718. In some examples, priority select information 735 may indicate: '11' for a high priority packet, '10' for queue intermittent, '01' for a normal or low priority packet, or '00' for queue bandwidth congestion. LUT module 732 may be configured to receive queue threshold region information 737 from LUT module 718. In some examples, queue threshold region information 737 may indicate: '11' for active stable region (e.g., Qlength, DQrate), '10' for bursting region (e.g., Qlength, no DQrate), '01' DQrate—emptying region (e.g., no Qlength, DQrate), or '00' for empty intermittent region (e.g., no Qlength, no DQrate). LUT module 732 may generate lifetime based on the priority select information 735.

Lifetime module 265 may determine a predicted lifetime based on a dequeue rate output by multiplexer 720. For example, for active queue state 608, multiplexer 720 is configured to output sampled dequeue rate 704 as the dequeue rate. In this example, latency module 728 determines latency based on the sampled dequeue rate 704 output by multiplexer 720 and queue length 706. LUT module 732 may determine a predicted lifetime by selecting a value of lifetime for the latency output by latency module 728 from a LUT for active queue state 608.

For bursting queue state 604, multiplexer 720 is configured to output target rate 702 as the dequeue rate. In this example, latency module 728 determines latency based on target rate 702 output by multiplexer 720 and queue length 706. LUT module 732 may determine a predicted lifetime by selecting a value of lifetime for the latency output by latency module 728 from a LUT for bursting queue state 604.

In some examples, for bursting queue state 604, lifetime module 265 may indicate queue length is less than a queue length bypass (e.g., queue length bypass is a control signal that selects the qlength for input to LUT module 732 rather than Latency) value when LUT module 718 outputs a logical high value '1' at queue length Bypass. For example, when LUT module 718 outputs a logical high value '1' at queue length bypass, multiplexer 731 outputs queue length 706 to LUT module 732, which may determine a predicted lifetime by selecting a value of lifetime for queue length 706 from a LUT for bursting queue state 604. However, when LUT module 718 outputs a logical low value '0' at queue length Bypass, multiplexer 731 outputs latency to LUT module 732, which may determine a predicted lifetime by selecting a value of lifetime for the latency output by latency module 728 from a LUT for bursting queue state 604. Qlength Bypass may be set by high priority as an input to LUT module 718 (e.g., one of static priority classes). This allows lifetime module 265 to use the Qlength as an input to LUT module 732 and a measure of lifetime at output of LUT module 732. For example, when creating the LUT that is indexed by queue length, lifetime module 265 can compute lifetime values assuming a fixed transmission rate, e.g., 400 Gbps. Because high priority is just that, lifetime module 265 may service high priority packets at the maximum rate of the Qsys, which in this example is 400 Gbps. As the qlength increases in magnitude, the lifetime also increases, because the rate is fixed (e.g., Qlength/Rate=Lifetime).

For fluctuating queue state 606, multiplexer 720 is configured to sampled dequeue rate 704 as the dequeue rate. In this example, LUT module 732 may determine a predicted lifetime by selecting a value of lifetime for the sampled dequeue rate 704 output by multiplexer 720 from a LUT for fluctuating queue state 606. For intermittent queue state 602, multiplexer 720 is configured to output target rate 702 as the dequeue rate. In this example, LUT module 732 may determine a predicted lifetime by selecting a value of lifetime for the output target rate 702 output by multiplexer 720 from a LUT for intermittent queue state 602.

Figure 8A:
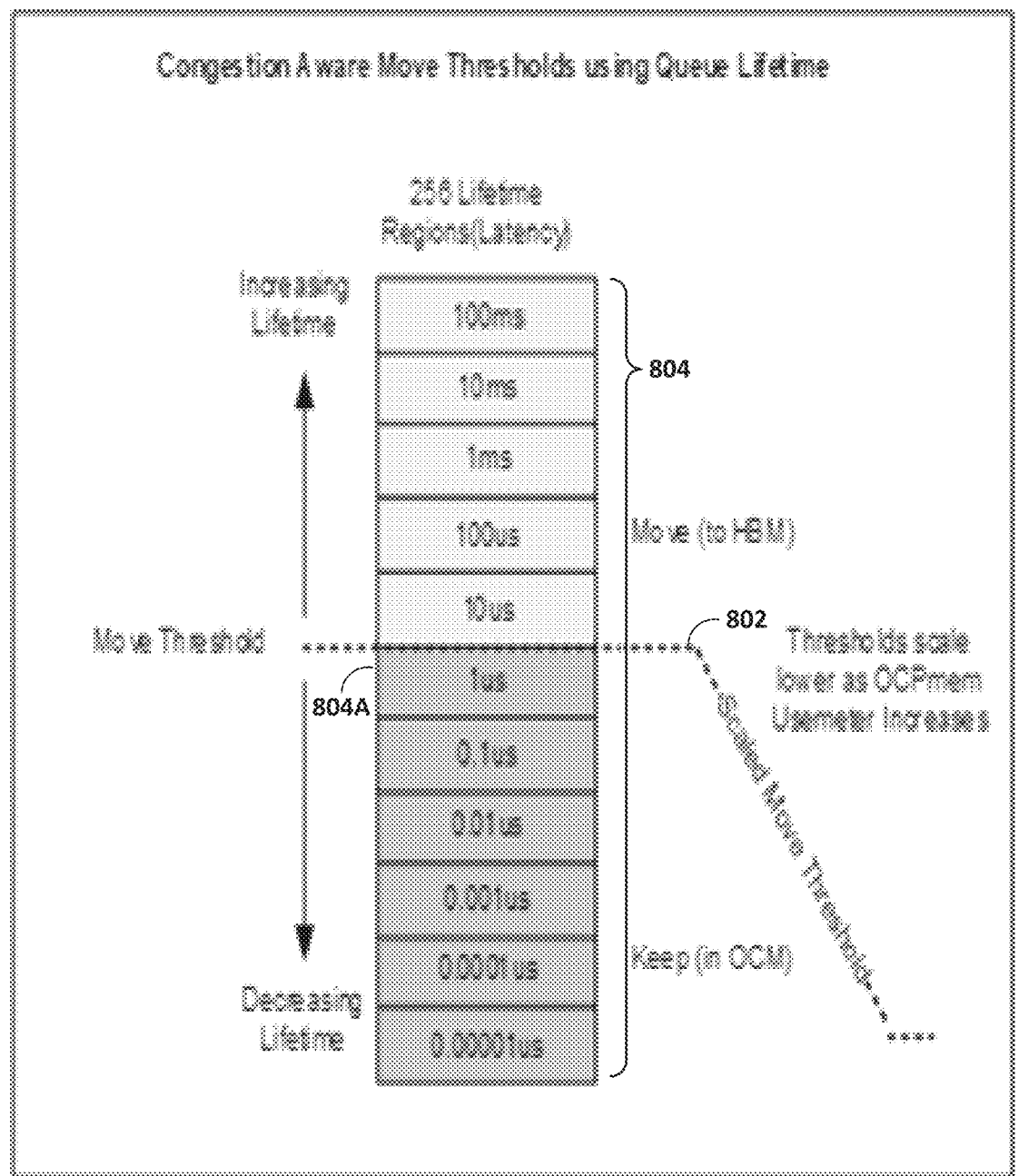
FIG. 8A is a conceptual diagram illustrating a first move threshold in accordance with the techniques of the disclosure.

FIG. 8A is a conceptual diagram illustrating a first move threshold 802 in accordance with the techniques of the disclosure. Move threshold 802 may be used by a router along with a predicted lifetime of a packet received by the router to determine whether to store the packet in a local memory or an external memory. In the example of FIG. 8, lifetime regions 804 may each be associated with a range of values. For example, lifetime region 804A may specify that lifetimes that are less than 1 microsecond (µs) are to be stored in local memory 429 and lifetimes that are not less than 1 microsecond (µs) are stored in external memory 427.

In some examples, move threshold manager 263 may modify move threshold 802 such that additional or fewer regions of lifetime regions 804 correspond to local memory 429. For example, as use meters indicate that local memory 429 is heavily used, move threshold manager 263 may reduce move threshold 802 such that fewer lifetime regions 804 correspond to local memory 429. In response, however, to use meters indicating that local memory 429 is lightly used, move threshold manager 263 may increase move threshold 802 such that additional lifetime regions 804 correspond to local memory 429. In this way, move threshold manager 263 may help to maximize a utilization of local memory 429.

Figure 8B:
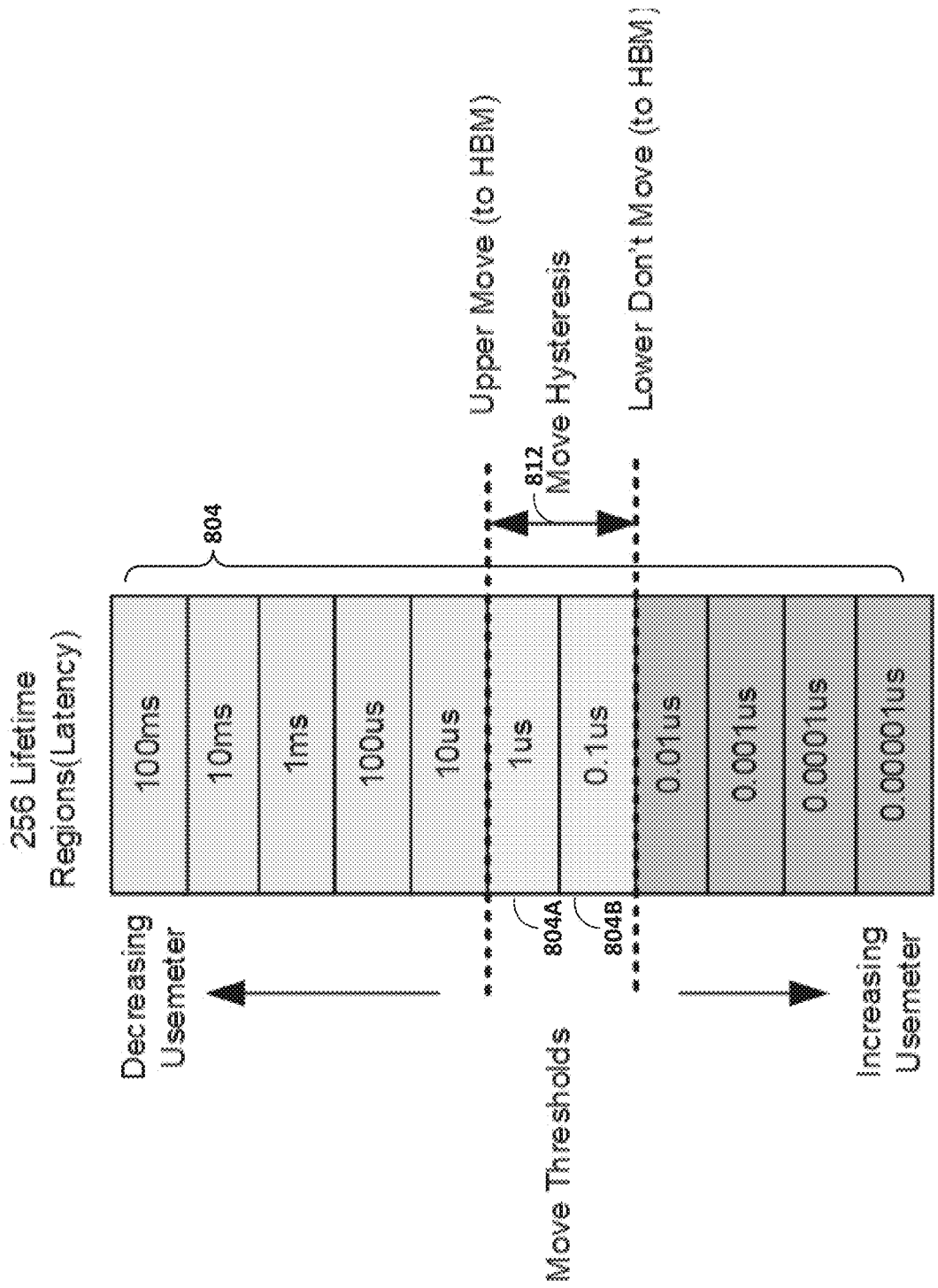
FIG. 8B is a conceptual diagram illustrating a second move threshold in accordance with the techniques of the disclosure.

FIG. 8B is a conceptual diagram illustrating a second move threshold 812 in accordance with the techniques of the disclosure. In the example of FIG. 8B, second move threshold 812 represents a move hysteresis that includes lifetime region 804A and lifetime region 804B. Move threshold manager 263 may scale second move threshold 812 lower as local memory use meter increase such that increasingly smaller latency is needed to stay in local memory 429. In some examples, move threshold manager 263 may scale second move threshold 812 higher as local memory use meter decreases such that larger latency packets stay in local memory 429 when room is available in local memory 429. In some examples, move threshold manager 263 may scale second move threshold 812 lower when queue bandwidth congestion occurs such that congested queues are more likely to move to external memory 427. In some examples, move threshold manager 263 may scale second move threshold 812 higher with increasing priority to help to keep higher priority packets in local memory 429.

Figure 9:
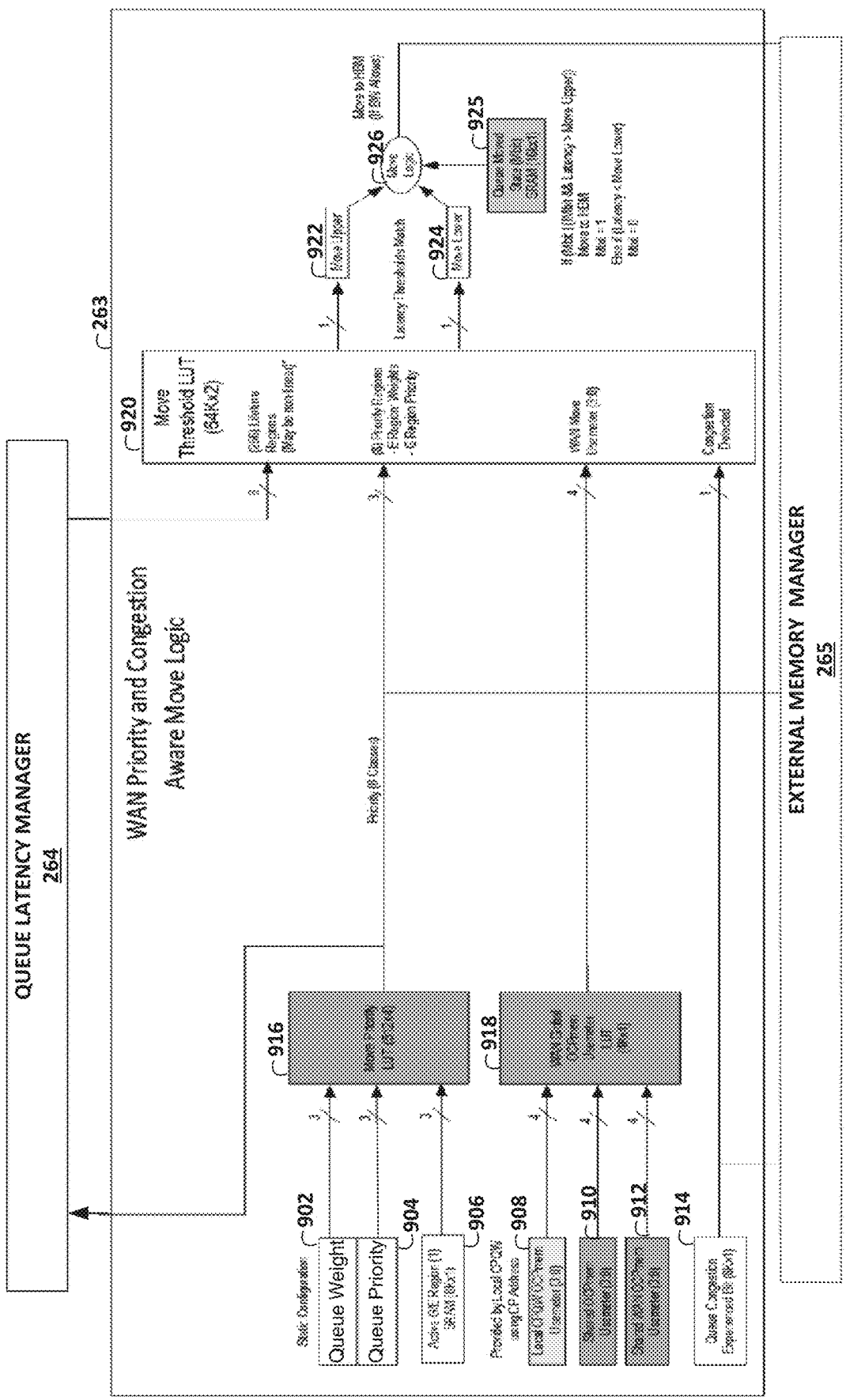
FIG. 9 is a block diagram illustrating a first example move threshold manager within the router of FIG. 2 in accordance with the techniques of the disclosure.

FIG. 9 is a block diagram illustrating a first example move threshold manager 263 within the router of FIG. 2 in accordance with the techniques of the disclosure. Move threshold manager 263 may determine a move threshold (e.g., move threshold 802, second move threshold 812, etc.) that may be used, along with a predicted lifetime, to determine whether to store the packet in a local memory or an external memory. As shown, move threshold manager 263 may receive queue weight 902, queue priority 904, active GE region 906, local Chunk Pointer Queue Weight (CPQW) 908 for local memory 429, shared use meter 910 for local memory 429, shared WAN use meter 912 for local memory 429, and queue congestion experienced bit 914.

Queue weight 902 may be weight value set by an administrator. Queue weight 902 may indicate weighted round robin (WRR) weights providing a pseudo priority for excess priority queues. Queue priority 904 may indicate a priority level for a network packet. Queue priority 904 may indicate static priority classes assigned by software that identify single and dual priority queues. In the example of FIG. 9, queue weight 902 and Queue priority 904 may form a static configuration. Active GE region 906 may indicate an active queue priority that indicates when dual priority queue is in a guaranteed or an excess priority region. Active GE region 906 may be updated each queue rate update and read on enqueue (NQ).

Local CPQW 908 may be provided by a local chuck pointer queue WAN by looking at each Chunk Pointer (CP) and seeing if a packet chunk address in in On-chip-packet memory (*OCPmem) or Packet Memory (Pmem). Chunk Pointer Queue (CPQW) may be the part of the Queuing System (Qsys) that keep pointers to packets chunks (e.g., 256 bytes) stored in the DBB. CPQW maintains a list of pointers per queue that link all of the chunks together in a Queue (FIFO). Packets are divided into fixed size chunks, stored to the DBB, local memory, or external memory, and pointers to these chunks are maintained by CPQW.

Shared use meter 910 for local memory 429 may be an example of total combined use meter 410 for local memory 429. Shared use meter 910 may be provided by a memory allocation (MALLOC) block that keeps track of how much local memory all WAN Qsys are using. Shared WAN use meter 912 for local memory 429 may be an example of shared use meter for WAN 408. Shared WAN use meter 912 may be provided by a memory allocation block that keeps track of how much local memory all WAN and fabric Qsys are using. Queue congestion experienced bit 914 may be the output of rate difference module 714. Queue congestion experienced bit 914 may indicate that queue bandwidth congestion is experienced when DQrate is lower than a target rate. In some examples, the queue congestion experienced bit 914 shifts the move threshold lower so congestion queues are more likely to move to external memory.

LUT module 916 may output a priority based on queue weight 902, queue priority 904, active GE region 906. Similarly, LUT module 918 may output a WAN move use meter based on local CPQW 908 for local memory 429, shared use meter 910 for local memory 429, and shared WAN use meter 912 for local memory 429. LUT 920 may output a move upper flag 922 based on a predicted lifetime (e.g., output by LUT module 732), the priority output by LUT module 916, the WAN move use meter output by LUT module 918, and queue congestion experienced bit 914. LUT module 916 may implement a compare function using lifetime, OCPmem use meters, and priority as its index. In this example, when the lifetime magnitude exceeds a logical threshold implemented in LUT module 918, move upper flag 922 is set to indicate that the lifetime magnitude exceeds a logical threshold implemented in LUT module 918.

Similarly, LUT 920 may output a move lower flag 924 based on a predicted lifetime (e.g., output by LUT module 732), the priority output by LUT module 916, the WAN move use meter output by LUT module 918, and queue congestion experienced bit 914. LUT module 916 may implement a compare function using lifetime, OCPmem use meters, and priority as its index. In this example, when the lifetime magnitude is less than a logical threshold implemented in LUT module 918, move lower flag 924 is set to indicate that the lifetime magnitude is less than a logical threshold implemented in LUT module 918.

Move logic 926 may adjust (e.g., reduce or increase) move threshold 802 based on move upper flag 922 and move lower flag 924. For example, move logic 926 may increase move threshold 802 when move upper flag 922 is set and move lower flag 924 is not set. In some examples, move logic 926 may reduce move threshold 802 and or move threshold 812 when move upper flag 922 is not set and move lower flag 924 is set. In the example of FIG. 9, move logic 926 may provide optional hysteresis using a "M" for moved bit 925 so that small changed in lifetime do not result in packets being moved and not moved during transitions. Thresholds may be set to a same value when no hysteresis is desired. Moved bit 925 may be defined by the following pseudo code.

```
If (Mbit | (!Mbit && Move Upper))
    Move to HBM
    Mbit = 1
Else if (Move Lower)
    Mbit = 0
```

In some examples, the output of move logic 926 may be used by external memory manager, for example, but not limited to, determining whether to drop a network packet. The LUT module 920 in FIG. 9 has 2 outputs, move upper flag 922 and move lower flag 924. The move upper flag 922 is an indication that a packet lifetime has exceeded a value determined by the Move LUT inputs and the packet is to move to external memory 427. This move lower flag 924 is an indication that the packet lifetime is below a threshold and is to stay in local memory 429. The move upper flag 922 sets a bit called M-bit, for Moved bit, that indicates a packet is stored to external memory 429. Move upper flag 922 sets the M-bit and move lower flag 924 clears the M-bit.

Figure 10:
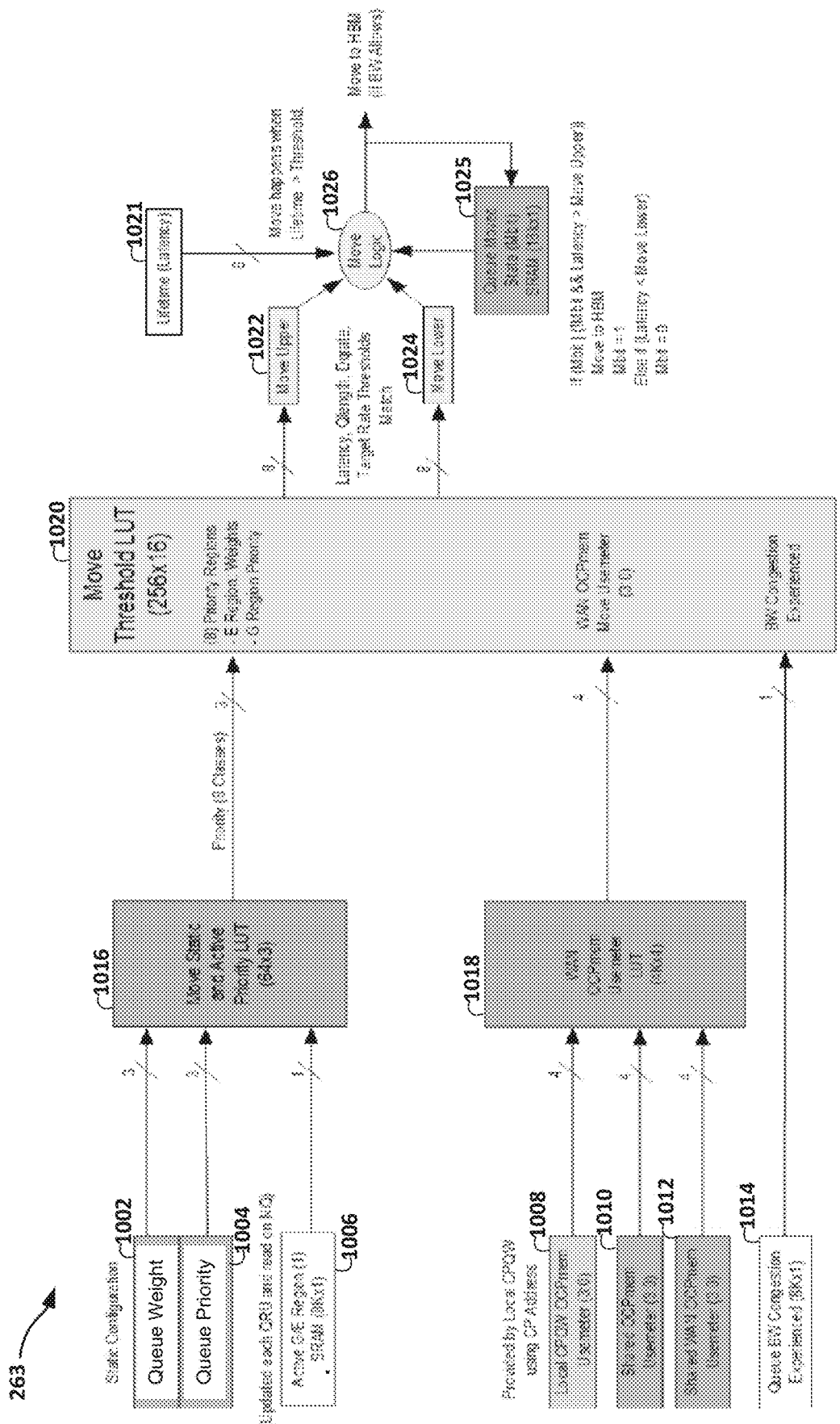
FIG. 10 is a block diagram illustrating a second example move threshold manager within the router of FIG. 2 in accordance with the techniques of the disclosure.

FIG. 10 is a block diagram illustrating a second example move threshold manager 263 within the router of FIG. 2 in accordance with the techniques of the disclosure. Move threshold manager 263 may determine a move threshold (e.g., threshold 802 and or move threshold 812) that may be used, along with a predicted lifetime, to determine whether to store the packet in local memory 429 or external memory 427. In the example of FIG. 10, LUT module 1016 may receive queue weight 1002, queue priority 1004, and active GE region 1006. In this example, LUT module 1018 may receive local Chunk Pointer Queue Weight (CPQW) 1008 for local memory 429, shared use meter 1010 for local memory 429, and shared WAN use meter 1012 for local memory 429. In this example, LUT module 1020 may receive queue congestion experienced bit 1014. Inputs 1002-1014 may be substantially similar to inputs 902-914 of FIG. 9. However, in the example of FIG. 10 move logic 1026 receives lifetime 1021.

In the example of FIG. 10, LUT module 1020 produces move upper threshold 1022. In this example, move logic 1026 compares move upper threshold 1022 with lifetime 1021 for each packet. Move threshold module 1020 produces move upper threshold 1022 for each combination of OCPmem use meter and priority index. Threshold values generally increase in magnitude as more local memory 429 is available, e.g., allowing more packets to use local memory 429, and generally decrease in value as less local memory 429 is available, thereby helping to force more packets to use external memory 427. When lifetime 1021 exceeds move upper threshold 1022, queue latency manager 264 moves the packet to external memory 427.

Similarly, LUT module 1020 produces move lower threshold 1024. In this example, move logic 1026 compares move lower threshold 1024 with lifetime 1021 for each packet. Move threshold module 1020 produces move lower threshold 1024 for each combination of OCPmem use meter and priority index. Threshold values generally increase in magnitude as more local memory 429 is available, e.g., allowing more packets to use local memory 429, and generally decrease in value as less local memory 429 is available, thereby helping to force more packets to use external memory 427. When lifetime 1021 is below move lower threshold 1024, move threshold manager 263 does not move the packet. For example, queue latency manager 264 keeps the packet in local to external memory 427.

Figure 11:
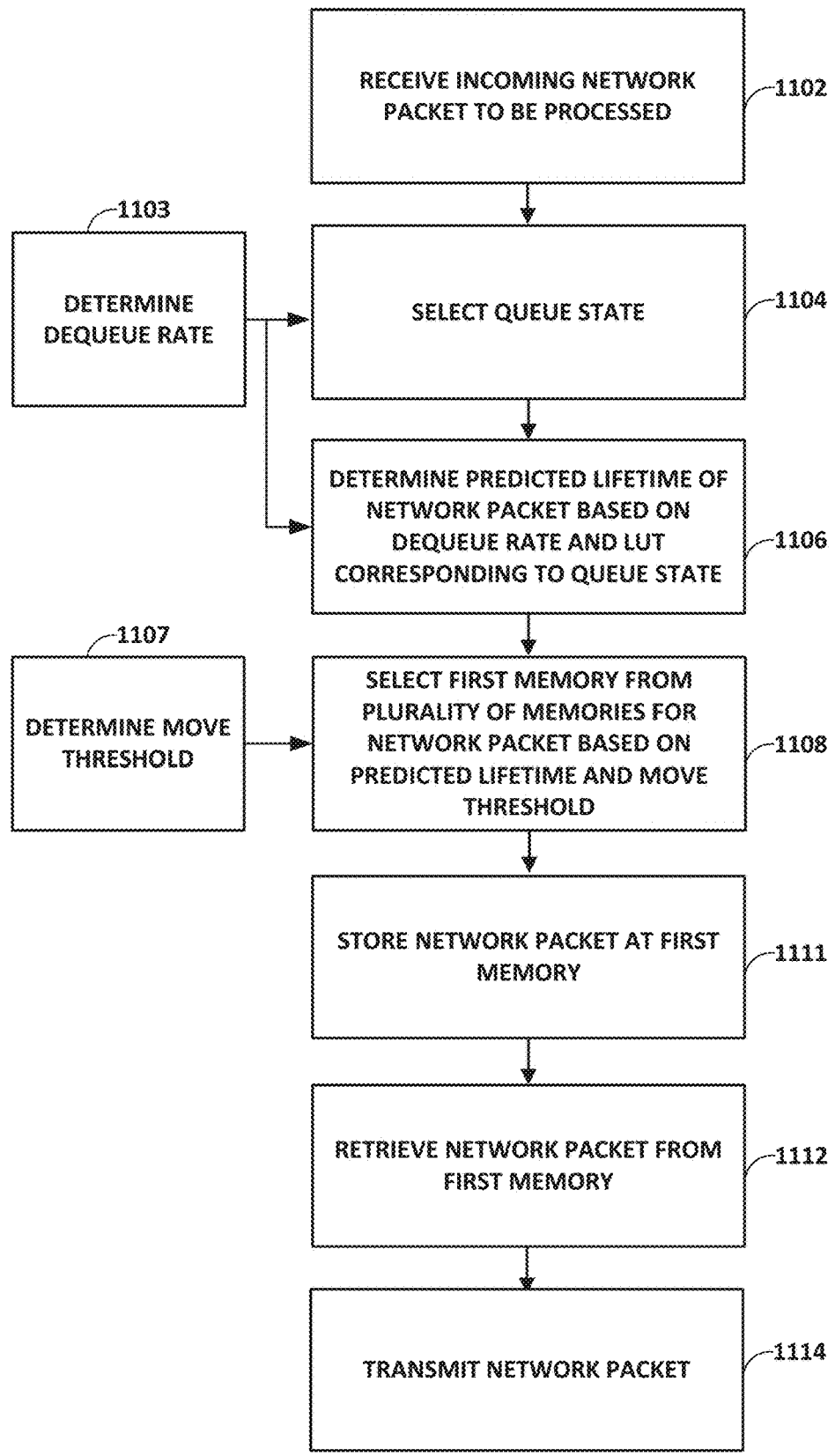
FIG. 11 is a flowchart illustrating an example operation in accordance with the techniques of the disclosure.

FIG. 11 is a flowchart illustrating an example operation in accordance with the techniques of the disclosure. FIG. 11 is described with respect to router 206 of FIG. 2 for exemplary purposes only. Initially, IFC 230A receives an incoming network packet to be processed (1002). In some examples, queue latency manager 264 initially stores the network packet at local memory 429.

Shaper credit update engine 262 determines a dequeue rate (1003). For example, shaper credit update engine 262 determines a number of tokens used over a unit of time by a token bucket shaper for the queue to dequeue one or more packets from the queue. In this example, each of the tokens represents a given number of bytes to be dequeued from the queue. In this example, shaper credit update engine 262 determines the sampled dequeue rate based on the number of tokens used over the unit of time.

Lifetime module 265 selects a queue state (1004). For example, lifetime module 265 selects a queue state from a plurality of queue states for the queue. More specifically, for example, lifetime module 265 selects an active queue state from the plurality of queue states for the queue when sampled dequeue rate 704 exceeds a threshold dequeue rate and when queue length 706 exceeds a threshold queue length. In some examples, lifetime module 265 selects a bursting queue state from the plurality of queue states for the queue when sampled dequeue rate 704 for the queue does not exceed a threshold dequeue rate and when queue length 706 exceeds a threshold queue length. In some examples, lifetime module 265 selects an intermittent queue state from the plurality of queue states for the queue when sampled dequeue rate 704 for the queue does not exceed a threshold dequeue rate and when queue length 706 for the queue does not exceed a threshold queue length. In some examples, lifetime module 265 selects a transient queue state from the plurality of queue states for the queue when sampled dequeue rate 704 exceeds a threshold dequeue rate and when queue length 706 of the queue does not exceed a threshold queue length.

Lifetime module 265 determines a predicted lifetime of the network packet based on the dequeue rate and a LUT corresponding the queue state (1006). For example, lifetime module 265 determines the predicted lifetime comprises using a look-up table corresponding to the selected queue state. More specially, for example, lifetime module 265 determines a latency for the queue based on a queue length of the queue and the dequeue rate. For example, lifetime module 265 determines the predicted lifetime using the determined latency as an input into a look-up table corresponding to the active queue state. In some examples, lifetime module 265 determines the predicted lifetime using the determined latency as an input into a look-up table corresponding to the bursting queue state.

In some examples, lifetime module 265 determines the predicted lifetime using a predetermined target dequeue rate as an input into a look-up table corresponding to the intermittent queue state. In some examples, lifetime module 265 determines the predicted lifetime using the sampled dequeue rate as an input into a look-up table corresponding to the transient queue state. Lifetime module 265 may determine a queue congestion experienced bit 712 at the queue based on a difference of sampled dequeue rate 704 and predetermined target rate 702 for the queue and may determine the predicted lifetime of the network packet based further on the queue congestion experienced bit 712. For example, LUT module 732 may select a LUT table corresponding to queue congestion when queue congestion experienced bit 712 indicates that the sampled dequeue rate 704 is less than predetermined target rate 702.

Move threshold manager 263 determines a move threshold (1007). For example, move threshold manager 263 determines a move threshold based on at least one of a use meter for the local memory or a priority for the queue. Queue latency manager 264 selects first memory from a plurality of memories for the network packet based on the predicted lifetime and move threshold (1008). For example, queue latency manager 264 selects local memory 429 as the first memory when the predicted lifetime does not exceed the move threshold. In some examples, queue latency manager 264 selects external memory 427 as the first memory when the predicted lifetime exceeds the move threshold.

Queue latency manager 264 stores the network packet at the first memory (1010). For example, queue latency manager 264 stores the network packet at local memory 429 when the predicted lifetime does not exceed the move threshold. In some examples, queue latency manager 264 stores the network packet at external memory 427 when the predicted lifetime exceeds the move threshold. Packet forwarding engine 226 retrieves the network packet from first memory (1012). IFC 230A transmits the network packet (1014).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:
receiving, by processing circuitry of a networking device, an incoming network packet to be processed, wherein the network packet is held in a queue prior to processing;
selecting, by the processing circuitry, a queue state from a plurality of queue states for the queue;
determining, by the processing circuitry, a predicted lifetime of the network packet based on a dequeue rate for the queue, wherein determining the predicted lifetime comprises using a look-up table corresponding to the selected queue state;
selecting, by the processing circuitry, a first memory from a plurality of memories for the network packet based on the predicted lifetime, wherein the plurality of memories includes a local memory of the processing circuitry and an external memory to the processing circuitry; and
storing, by the processing circuitry, the network packet at the first memory in response to selecting the first memory from the plurality of memories.

2. The method of claim 1, wherein determining the predicted lifetime of the network packet comprises:
determining a latency for the queue based on a queue length of the queue and the dequeue rate.

3. The method of claim 2, wherein the dequeue rate comprises a sampled dequeue rate for the queue, wherein the selected queue state is an active queue state, and wherein selecting the queue state comprises:
selecting the active queue state from the plurality of queue states for the queue when the sampled dequeue rate exceeds a threshold dequeue rate and when the queue length exceeds a threshold queue length, wherein determining the latency is in response to selecting the active queue state, and wherein determining the predicted lifetime further comprises using the determined latency as an input into a look-up table corresponding to the active queue state.

4. The method of claim 2, wherein the dequeue rate comprises a predetermined target dequeue rate for the queue, wherein the selected queue state is a bursting queue state, and wherein selecting the queue state comprises:
selecting the bursting queue state from the plurality of queue states for the queue when a sampled dequeue rate for the queue does not exceed a threshold dequeue rate and when the queue length exceeds a threshold queue length, wherein determining the latency is in response to selecting the bursting queue state, and wherein determining the predicted lifetime further comprises using the determined latency as an input into a look-up table corresponding to the bursting queue state.

5. The method of claim 1, wherein the dequeue rate comprises a predetermined target dequeue rate for the queue, wherein the selected queue state is an intermittent queue state, and wherein selecting the queue state comprises:
selecting the intermittent queue state from the plurality of queue states for the queue when a sampled dequeue rate for the queue does not exceed a threshold dequeue rate and when a queue length for the queue does not exceed a threshold queue length, wherein determining the predicted lifetime comprises using the predetermined target dequeue rate as an input into a look-up table corresponding to the intermittent queue state.

6. The method of claim 1, wherein the dequeue rate comprises a sampled dequeue rate for the queue, wherein the selected queue state is a transient queue state, and wherein selecting the queue state comprises:
selecting the transient queue state from the plurality of queue states for the queue when the sampled dequeue rate exceeds a threshold dequeue rate and when a queue length of the queue does not exceed a threshold queue length, wherein determining the predicted lifetime comprises using the sampled dequeue rate as an input into a look-up table corresponding to the transient queue state.

7. The method of claim 1, wherein the dequeue rate comprises a sampled dequeue rate for the queue, the method further comprising:
determining, by the processing circuitry, a queue congestion experienced at the queue based on a difference of the sampled dequeue rate and a predetermined target dequeue rate for the queue, wherein determining the predicted lifetime is further based on the queue congestion.

8. The method of claim 1, wherein selecting the first memory comprises:
determining a move threshold based on at least one of a use meter for the local memory or a priority for the queue; and
comparing the move threshold with the predicted lifetime.

9. The method of claim 8, wherein selecting the first memory comprises:
selecting the local memory as the first memory when the predicted lifetime does not exceed the move threshold; and
selecting the external memory as the first memory when the predicted lifetime exceeds the move threshold.

10. The method of claim 1, comprising:
in response to receiving the network packet, storing, by the processing circuitry, the network packet in the local memory prior to selecting the first memory.

11. The method of claim 1, wherein the networking device is a first networking device, the method further comprising:
retrieving, by the processing circuitry, the network packet from the first memory; and
transmitting, by the processing circuitry, the retrieved network packet to a second networking device.

12. The method of claim 1, wherein the dequeue rate comprises a sampled dequeue rate for the queue, the method further comprising:
determining by the processing circuitry, a number of tokens used over a unit of time by a token bucket shaper for the queue to dequeue one or more packets from the queue, wherein each of the tokens represents a given number of bytes to be dequeued from the queue; and
determining, by the processing circuitry, the sampled dequeue rate based on the number of tokens used over the unit of time.

13. A networking device comprising:
a plurality of memories comprising a local memory of processing circuitry and an external memory to the processing circuitry; and
the processing circuitry connected to the plurality of memories and configured to:
receive an incoming network packet to be processed, wherein the network packet is held in a queue prior to processing;
select a queue state from a plurality of queue states for the queue;
determine a predicted lifetime of the network packet based on a dequeue rate for the queue, wherein, to determine the predicted lifetime, the processing circuitry is configured to use a look-up table corresponding to the selected queue state;
select a first memory from the plurality of memories based on the predicted lifetime; and
store the network packet at the first memory in response to selecting the first memory from the plurality of memories.

14. The networking device of claim 13, wherein, to determine the predicted lifetime of the network packet, the processing circuitry is configured to:
determine a latency for the queue based on a queue length of the queue and the dequeue rate.

15. The networking device of claim 14, wherein the dequeue rate comprises a sampled dequeue rate for the queue, wherein the selected queue state is an active queue state, and wherein, to select the queue state, the processing circuitry is configured to:
select the active queue state from the plurality of queue states for the queue when the sampled dequeue rate exceeds a threshold dequeue rate and when the queue length exceeds a threshold queue length, wherein determining the latency is in response to selecting the active queue state and wherein, to determine the predicted lifetime, the processing circuitry is further configured to use the determined latency as an input into a look-up table corresponding to the active queue state.

16. The networking device of claim 14, wherein the dequeue rate comprises a predetermined target dequeue rate for the queue, wherein the selected queue state is a bursting queue state, and wherein, to select the queue state, the processing circuitry is configured to:
select the bursting queue state from the plurality of queue states for the queue when a sampled dequeue rate for the queue does not exceed a threshold dequeue rate and when the queue length exceeds a threshold queue length, wherein determining the latency is in response to selecting the bursting queue state and wherein, to determine the predicted lifetime, the processing circuitry is further configured to use the determined latency as an input into a look-up table corresponding to the bursting queue state.

17. The networking device of claim 14, wherein the dequeue rate comprises a predetermined target dequeue rate for the queue, wherein the selected queue state is an intermittent queue state, and wherein, to select the queue state, the processing circuitry is configured to:
select the intermittent queue state from the plurality of queue states for the queue when a sampled dequeue rate for the queue does not exceed a threshold dequeue rate and when a queue length for the queue does not exceed a threshold queue length, wherein, to determine the predicted lifetime, the processing circuitry is configured to use the predetermined target dequeue rate as an input into a look-up table corresponding to the intermittent queue state.

18. The networking device of claim 13, wherein the dequeue rate comprises a sampled dequeue rate for the queue, wherein the selected queue state is a transient queue state, and wherein, to select the queue state, the processing circuitry is configured to:
select the transient queue state from the plurality of queue states for the queue when the sampled dequeue rate exceeds a threshold dequeue rate and when a queue length of the queue does not exceed a threshold queue length, wherein, to determine the predicted lifetime, the processing circuitry is configured to use the sampled dequeue rate as an input into a look-up table corresponding to the transient queue state.

19. The networking device of claim 13, wherein the dequeue rate comprises a sampled dequeue rate for the queue and wherein the processing circuitry is configured to:
determine a queue congestion experienced at the queue based on a difference of the sampled dequeue rate and a predetermined target dequeue rate for the queue, wherein determining the predicted lifetime is further based on the queue congestion.

20. The networking device of claim 13, wherein, to select the first memory, the processing circuitry is configured to:
determine a move threshold based on at least one of a use meter for the local memory or a priority for the queue; and
compare the move threshold with the predicted lifetime.

21. The networking device of claim 20, wherein, to select the first memory, the processing circuitry is configured to:
select the local memory as the first memory when the predicted lifetime does not exceed the move threshold; and
select the external memory as the first memory when the predicted lifetime exceeds the move threshold.

22. The networking device of claim 13, wherein the processing circuitry is configured to:
in response to receiving the network packet, store the network packet in the local memory prior to selecting the first memory.

23. The networking device of claim 13, wherein the networking device is a first networking device and wherein the processing circuitry is configured to:
retrieve the network packet from the first memory; and
transmit the retrieved network packet to a second networking device.

24. The networking device of claim 13, wherein the dequeue rate comprises a sampled dequeue rate for the queue and wherein the processing circuitry is configured to:
determine a number of tokens used over a unit of time by a token bucket shaper for the queue to dequeue one or more packets from the queue, wherein each of the tokens represents a given number of bytes to be dequeued from the queue; and
determine the sampled dequeue rate based on the number of tokens used over the unit of time.

25. A non-transitory computer-readable medium comprising instructions that, when executed, cause processing circuitry of a networking device to:
receive an incoming network packet to be processed, wherein the network packet is held in a queue prior to processing;
select a queue state from a plurality of queue states for the queue;
determine a predicted lifetime of the network packet based on a dequeue rate for the queue, wherein, to determine the predicted lifetime, the instructions cause the processing circuitry to use a look-up table corresponding to the selected queue state;
select a first memory from a plurality of memories for the network packet based on the predicted lifetime, wherein the plurality of memories includes a local memory of the processing circuitry and an external memory to the processing circuitry; and
store the network packet at the first memory in response to selecting the first memory from the plurality of memories.

* * * * *

UNITED STATES PATENT AND TRADEMARK OFFICE
CERTIFICATE OF CORRECTION

PATENT NO. : 10,623,329 B2  
APPLICATION NO. : 16/020842  
DATED : April 14, 2020  
INVENTOR(S) : Craig R. Frink Page 1 of 1

It is certified that error appears in the above-identified patent and that said Letters Patent is hereby corrected as shown below:

In the Claims

Column 24, Line 59 (Claim 17) Replace "device of claim 14," with --device of claim 13,--

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*